(12) United States Patent
Watanabe et al.

(10) Patent No.: US 8,308,293 B2
(45) Date of Patent: Nov. 13, 2012

(54) POLARIZING LENS

(75) Inventors: Yoshifumi Watanabe, Shinjuku-ku (JP); Eiichi Yajima, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 103 days.

(21) Appl. No.: 12/850,298

(22) Filed: Aug. 4, 2010

(65) Prior Publication Data

US 2011/0037943 A1 Feb. 17, 2011

(30) Foreign Application Priority Data

Aug. 5, 2009 (JP) .................................. 2009-182883
Jun. 29, 2010 (JP) .................................. 2010-147038

(51) Int. Cl.
*G02C 7/12* (2006.01)
*G02B 1/08* (2006.01)
(52) U.S. Cl. .............................. 351/159.56; 359/486.01
(58) Field of Classification Search .......... 351/163–165, 351/159.6–159.65; 359/486.01–486.03
See application file for complete search history.

(56) References Cited

U.S. PATENT DOCUMENTS

| 2,359,456 A | 10/1944 | Young |
| 2,400,877 A | 5/1946 | Dreyer |
| 2,577,620 A | 12/1951 | Mahler |
| 2,603,129 A | 7/1952 | Dreyer |
| 3,538,322 A * | 11/1970 | Arsem ............................ 362/19 |
| 4,865,668 A | 9/1989 | Goepfert et al. |
| 7,597,442 B2 | 10/2009 | Biver et al. |
| 7,632,540 B2 * | 12/2009 | Kumar et al. ................. 427/162 |
| 2008/0252846 A1 | 10/2008 | Biver et al. |

FOREIGN PATENT DOCUMENTS

| JP | 2002-527786 A | 8/2002 |
| JP | 2007-77327 A | 3/2007 |
| WO | 00/22463 A1 | 4/2000 |
| WO | 2006/081006 A2 | 8/2006 |

OTHER PUBLICATIONS

European Search Report dated Nov. 22, 2010.

* cited by examiner

*Primary Examiner* — Darryl J Collins
(74) *Attorney, Agent, or Firm* — Sughrue Mion, PLLC

(57) ABSTRACT

An aspect of the present invention relates to a polarizing lens comprising a polarizing layer on a substrate, wherein the polarizing layer comprises polarization axes that are at least partly curved.

10 Claims, 11 Drawing Sheets

A

B

POLARIZING LENS

CROSS-REFERENCE TO RELATED APPLICATIONS

This application claims the benefit of priority under 35 USC 119 to Japanese Patent Application No. 2009-182883 filed on Aug. 5, 2009 and Japanese Patent Application No. 2010-147038 filed on Jun. 29, 2010, which are expressly incorporated herein by reference in their entirety.

BACKGROUND OF THE INVENTION

1. Field of the Invention

The present invention relates to a polarizing lens that is suitable for use as an eyeglass lens functioning to absorb or transmit light of a specific direction of polarization for the purpose of blocking light such as reflected light having a specific direction of polarization outdoors or the like.

2. Discussion of the Background

Polarizing lenses have been developed to reduce light reflecting off the surface of water, the glare from illumination, and the like so as to improve the field of view in outdoor activities and the like. Polarizing films prepared by stretching a conventional polymer film in a prescribed direction to specify directions of the polarization axes have generally been employed in such polarizing lenses as well as the polarizing elements used in liquid-crystal displays and the like. In this regard, polarizing layers formed by laminating dichroic dyes on orienting films positioned on the surface of a substrate have been developed in recent years. For example, a polarizing element having a polarizing layer and a protective layer on the surface of a transparent substrate as well as having an inorganic intermediate layer of silica ($SiO_2$) or the like as an orienting film between the polarizing layer and the transparent substrate has been proposed as a structure for such polarizing elements employing dichroic dyes. Such polarizing elements are proposed in WO2006/081006, which is expressly incorporated herein by reference in its entirety. By providing a pattern of peaks and valleys in the form of stripes, for example, on an orienting film, the polarizing element is formed so that the polarization axes run either in the direction of the stripes or perpendicular to them.

A polarizing lens for eyeglasses in which the surface of the lens is, for example, divided into middle, left, and right portions, and polarizing films of different directions of polarization axes are incorporated into the divided regions has been proposed in US2008/0252846A1 and Family member U.S. Pat. No. 7,597,442, which are expressly incorporated herein by reference in their entirety. In the eyeglass lens described in US2008/0252846A1, as shown in the plan view of FIG. 10, for example, the optical surface of lens 100 is divided into three parts by dividing lines running vertically (perpendicular) to the line of sight. Among these three divided regions, in center region 101, the polarization axes are straight lines running left and right (horizontally) with respect to the line of sight. In left and right peripheral portions 102a and 102b, that is, in the peripheral portions of the nose side and the ear side, the polarization axes are straight lines running up and down (vertically).

Regions comprised of polarization axes vertically running in different directions are provided in the polarizing lens described in US2008/0252846A1, in contrast to a conventional polarizing lens, in which the polarization axes (absorption axes) are straight lines running horizontally to suppress light reflecting off horizontal surfaces such as the surface of a body of water such as the sea or a river. This is to adapt to the general conditions of glare in an urban environment by taking into account the effects on the horizontal portions of the field of view of reflections off of window glass and the like on the vertical walls of buildings in the urban environment. It is also to adapt to vehicles present to the right and left of the wearer, and to the field of view of vehicle drivers.

However, in the polarizing lens described in US2008/0252846A1, when the polarization axis is sharply distributed perpendicular to a specified direction as shown in FIG. 10, and the orientation of the face is slightly changed, there are cases where the function of blocking reflected light may suddenly decrease. In such cases, they eyes end up being stimulated in an unpleasant manner.

In reality, the direction of polarization of light reflecting off of vertical surfaces such as window glass is not necessary a constant direction. There are many situations where the reflected light cannot be adequately suppressed even when using the polarizing lens disclosed in US2008/0252846A1. The change in the direction of polarization of such reflected light will be described with reference to FIGS. 11 to 14.

FIG. 11 is a diagram showing the direction of polarization of light reflecting off of a horizontal surface such as the surface of a body of water. FIG. 11 is a lateral view of how a ray of incident light Li reflects off horizontal surface 50 in the form of the surface of a body of water, the glossy surface of a table, or the like. The normal line to the position of incidence on horizontal surface 50 is indicated by dotted line v and the reflected light is indicated by arrow Lr. Natural light such as sunlight does not have a definite direction of polarization, but is polarized in every direction. The component of light in which the electric vector oscillates along a plane (the incidence plane) running in the direction of incidence and the direction of reflection, as indicated by arrow p, is called p component (p polarized light), and the component of light in which the electric vector oscillates perpendicular to the incidence plane, as indicated by arrow s, is called the s component (s polarized light). The reflectance of the light changes with the angle of incidence, but in most regions from an angle of incidence of 0° to 90°, the reflectance of p polarized light is lower than the reflectance of s polarized light. At a given angle of incidence (Brewster angle $\theta_B$), it is known to become zero.

Additionally, the larger the angle of incidence of s polarized light becomes, the greater the reflectance tends to be. In most regions, the reflectance of s polarized light is greater than that of p polarized light. That is, in reflected light Lr, s polarized light is dominant over most of the range of angles of incidence. Accordingly, it is possible to efficiently control light reflecting off the surface of such an object by blocking s polarized light with a polarizer. In particular, since only s polarized light is reflected in light reflecting at the Brewster angle, the reflected light can be suppressed to near zero.

As shown in FIG. 11, when human eye 60 is looking in a horizontal direction, the direction of polarization of the reflected light is transverse relative to eye 60, that is, horizontal. When the polarization axis that blocks the polarization direction (s polarized light) of such reflected light (the direction in which s polarized light is absorbed and p polarized light is passed) is made the absorption axis and a polarizing lens is worn, if the absorption axis is the horizontal direction, light reflecting of a horizontal surface can be suppressed well. When viewing a horizontal surface such as the surface of a body of water, it is sufficient to block s polarized light regardless of the angle of incidence, that is, any polarizing lens having an absorption axis that is horizontal will do, regardless of the position of the sun.

However, light reflecting off of approximately vertical surfaces, such as the exteriors of buildings, the lateral surfaces of vehicles, and window glass has a different direction of polarization. FIG. 12 is a drawing showing the direction of polarization when incident light Li enters from a horizontal direction relative to vertical surface 51. In FIG. 12, portions corresponding to FIG. 11 are denoted by identical numbers and their repeat description is omitted. Reflected light Lr from vertical surface 51 is similarly dominated by s polarized light that is vertical to the surface of incidence, but s polarized light when the light comes from a horizontal direction is in a vertical direction as viewed by human eye 60. That is, to block the light arriving in a horizontal direction that has reflected off a vertical surface relative to human eye 60, it is desirable to wear a polarizing lens with absorption axes lying in the vertical direction.

However, the direction of polarization of reflected light only becomes vertical under special conditions at dawn and dusk, and the direction of polarization of reflected light changes over time. For example, as shown in FIG. 13, the direction of polarization of light Lr reflecting off of vertical surface 51 when incident light Li arrives at a diagonal angle becomes diagonal relative to eye 60 when vertical surface 51 is viewed from below at an angle looking upward. As shown in FIG. 14, at around noon, the light enters vertical surface 51 from a direction vertically above, so the direction of polarization of reflected light Lr becomes nearly horizontal with respect to human eye 60 when looking upward from below. In FIGS. 13 and 14, portions corresponding to FIG. 12 are denoted by identical numbers and their repeat description is omitted.

That is, the direction of polarization of light reflecting off of vertical surface 51 gradually changes over time within a range running from the horizontal to the vertical direction. Additionally, there are also cases where light reflects off of curved surfaces and inclined surfaces on vehicles and the like in addition to buildings. Thus, in the urban environment, there are directions of polarization in directions inclined at various angles. Accordingly, simply making the absorption axes horizontal in the middle and vertical on the left and right sides in the manner described in US2008/0252846A1 ends up causing the effect of reflected light suppression to go unutilized during many periods of the day, resulting in a polarizing lens that cannot function satisfactorily.

Based on the same principle, even revolution of the human eyeball can conceivably change the direction of polarization of reflected light. The angle of incidence of reflected light does not depend just on the displacement of sunlight. For example, when buildings are located close together in the urban environment, multiple reflections between building and building, building and car, and the like can cause the angle of incidence to change to one that differs from the orientation of sunlight. In such cases, when the eyeballs are revolved, causing reflected light arriving from a diagonal direction to enter the eyes, the blocking function of a polarizing lens configured as shown in FIG. 10 is inadequate. That is, so long as the absorption axes of the polarizing lens is linear and the directions are limited to the horizontal and vertical, the suppressive effect on reflected light will be limited and there will be numerous conditions and periods of day when the effect will be inadequate.

In configurations in which the boundary line of the polarization axis (absorption axis) of a lens changes 90° at a boundary, directional revolution of the eyeball will sharply change how well a polarizing lens blocks light; it is undesirable for the eye. Blocking reflected light in diagonal directions when the directions of the absorption axes are divided into individual zones and are discontinuous requires, for example, changing the area of regions in which the polarization axes are vertical in peripheral portions, or assembling polarizing elements with absorption axes aligned in different directions. That is, when the surface of a lens is simply divided up into multiple sections and regions with different absorption axes are provided, multiple variations must be prepared to block polarized light that enters from the diagonal direction and varies or changes the angle of incidence of the light. This is extremely impractical because it requires the wearer to change polarizing lenses based on need. Thus, there is a need for a polarizing lens that does not require the switching out of polarizing lenses and that is capable of flexibly handling directions of polarization of reflected light that change with the angle of incidence of light and directional revolution of the eyeball.

SUMMARY OF THE INVENTION

An aspect of the present invention provides for a polarizing lens having a blocking effect on light reflected over a broader range of angles of incidence.

An aspect of the present invention relates to a polarizing lens comprising a polarizing layer on a substrate, wherein the polarizing layer comprises polarization axes that are at least partly curved.

In the present invention, the term "polarization axis" refers to an absorption axis that absorbs light in a specified direction of polarization. The term "direction of polarization axis" (polarization axis direction) refers to the tangential direction with regard to a polarization axis that is curved. As set forth above, the polarizing lens of the present invention has polarization axes that are at least partly curved. Thus, the in-surface distribution of the polarization axes changes smoothly; the directions of the polarization axes do not change abruptly in the manner of the polarizing lens described in US2008/0252846A1. Thus, at least in the region where the polarization axes are curved, an abrupt decrease in the blocking effect when the wearer revolves his eyeballs is avoided, permitting a structure in which the blocking effect changes gradually in a manner corresponding to movement of the eyeball. Further, the two ends of polarization axis that is curved are not joined to form a loop.

One embodiment of the polarizing lens of the present invention desirably comprises polarization axes that are curved and inclined relative to a horizontal direction in a left and right peripheral region away from the geometric center of the lens.

In the present invention, the "geometric center of the lens" refers to the optical center of the lens when no corrected vision is added and in the case of a single-vision lens. In the case of a progressive dioptric power lens for both near and far viewing, it refers to the prism measurement reference point. However, depending on the design and the like, it may refer to a location away from the prism measurement reference point, such as the middle point of a line segment connecting the reference point for measurement of far portion and the reference point for measurement of near portion. The term "left and right peripheral region away from the geometric center" means regions positioned at the side of the ear or the side of the noise based on a center region containing the geometric center when the lens is being worn. Unless specifically stated otherwise, positions and directions on the lens in the present invention refer to positions and directions when the lens is being worn.

By using a configuration in which the directions of the polarization axes are inclined relative to a horizontal direction in a right and left peripheral region of the lens, when the eyeballs of the wearer are rotated to change the direction of the line of sight of the wearer from the front to either the right or left, or a diagonal direction, it becomes possible to block polarized light entering in a diagonal direction from a building, car window, or the like. Further, having at least some curved polarization axes in the polarizing lens of the present invention continuously changes the directions of the polarization axis in a diagonal direction, creating a state in which a polarizing film has the effect of blocking light entering from diagonal directions over a broad range of angles. Thus, it becomes possible to handle not just changes over time in light reflecting off the surfaces of structures such as buildings, but also reflected light containing complex axial directions that is reflected off of the curved glass surfaces of automobiles, for example. Further, abrupt changes in blocking effects can be avoided that are caused by changes in the direction of the line of sight of a lens wearer due to rotational movement of the eyeballs under such conditions. The term "rotation of the eyeballs" in the present invention refers not just to cases of random rotation, but also to rotation with the front direction as a center axis (that is, revolution).

For example, the conventional polarizing lens shown in FIG. 10, which has only linear polarization axes provided horizontally in the center and vertically on the two sides, can only block light from specific directions in the light reflecting off vertical surfaces such as buildings and curved surfaces such as cars. In contrast, the present invention can have a blocking effect on incident light entering at various angles in diagonal directions, as set forth above. Providing a region in the center of the lens in which the polarization axes are horizontal can permit the blocking of light from above that is reflecting off of vertical surfaces and light that is reflecting off of horizontal surfaces in the center portion of the lens, and the blocking of reflected light from diagonal directions in the peripheral regions, thereby blocking effectively unneeded light. In this case, the wearer can rotate his eyeballs as needed to suitably select a proper line of sight.

A desirable embodiment of the polarizing lens of the present invention is configured to include a region in which the directions of the curved polarization axes are formed based on the direction of rotation of the eyeballs. That is, in the polarizing lens of the present invention, the curved polarization axes are desirably disposed in a portion that is made the field of view by changing the direction of the line of sight from the front direction to a horizontal or diagonal direction by rotating the eyeballs, for example. Thus, the wearer can realize a blocking effect even when the direction of the line of sight of the wearer is changed by rotating the eyeballs.

Providing a region in which curved polarization axes are disposed in a manner corresponding to change in the direction of the line of sight by rotating the eyeballs in this manner makes it possible to distribute the polarization axes according to movement of the eyeballs. Accordingly, the structure can become one that blocks light by more flexibility handling changes in the outside world due to the rotation of the eyeballs, that is, changes in the direction of polarization of light entering the eyeballs. The light-blocking effect can change smoothly based on the natural movement of the eyeballs.

A further desirable embodiment of the present invention is a distribution of the directions of the curved polarization axes in the peripheral regions of the lens such that the further the direction of the line of sight moves by eyeball rotation away from the front direction relative to the lens, the greater the incline relative to the horizontal direction. That is, the shape of the curve of the polarization axes in the peripheral portion of the lens is desirably determined so that the greater the eyeball rotation by the wearer, the greater the incline relative to the horizontal direction. To this end, the shape of the curve of the polarization axes is desirably determined based on the tendency of rotational movement (revolution) of the eyeballs by a standard wearer or actual wearer.

When such a configuration is employed and when the eyeballs are gradually rotated from the front direction toward a left or right peripheral view or diagonally upward, a suitable blocking effect can be exerted on light reflected from vertical surfaces such as buildings lying in the direction of the line of sight. Accordingly, the use of this configuration can provide a polarizing lens that achieves a blocking effect based on polarization that responds flexibly to movement of the eyeballs by the wearer from the front direction to the left or right horizontally.

A further desirable embodiment of the polarizing lens of the present invention is continuous change in the directions of the polarization axes. When the x-axis lies in a horizontal direction (standard line direction) running through the geometric center of the lens and the y-axis runs in a direction perpendicular thereto through the geometric center, for example, the term "continuous" as used here ideally means the state in which the second derivatives become constant and there is no divergence in the distribution of the polarization axes when the directions of the polarization axes in the polarizing layer are projected onto the plane of the x-y coordinate axes. The degree of continuity need only be of a scale that is recognizable by human vision; continuity at the microscope scale of the molecule or the like is not required. Further, when, for example, the directions of the polarization axes are comprised of a linear region and a curved region, the connecting portion desirably changes smoothly.

A further desirable embodiment of the polarizing lens of the present invention is one in which the distribution of the polarization axes contains a region in which the directions of the polarization axes are horizontal within a region extending from the center region of the lens to the vertical direction. That is, within a region extending from a center region containing a geometric center to a vertical direction, a region in which directions of the polarization axes are horizontal is desirably positioned. In the present invention, the term "vertical direction" means the direction running along the meridian when the vertical direction from the geometric center of the lens (and the directly extending upward from it) is projected onto the lens surface.

When employing such a configuration, the direction of polarization of light reflecting off of horizontal surfaces and vertical surfaces that is seen when the eyeballs are rotated to change the direction of the line of sight from the front direction to a vertical direction is horizontal, so the lens can function to block reflected light of this orientation.

A further desirable embodiment of the polarizing lens of the present invention is a distribution of the directions of the polarization axes that is arc-shaped. That is, the directions of the polarization axes desirably change in arc shapes. The use of an arc shape allows the directions of the polarization axes to continuously change from diagonal to something approximating the vertical direction. In response to change in the direction of the line of sight by rotation of the eyeballs, the polarization axes can be distributed in a natural fashion that is not excessive. The arcs can be sections of a circle or sections of an ellipse; the effect can be achieved in either case.

When employing an arc-shaped distribution, the center thereof can be positioned in a region extending from a geometric center of the lens to a vertical direction. That is, the center of the circle forming the arc can be positioned in a region extending from a geometric center of the lens to a vertical direction so that the direction of the polarization axes is horizontal in at least the front direction and regions above and below it, with light reflecting off of horizontal surfaces and light reflecting from vertical surfaces located directly forward being blocked.

When employing an elliptical distribution, that is, when the arc is a portion of an ellipse, the short axis or long axis of the ellipse can be positioned in a region extending from the geometric center to the vertical direction (including along the line of extension thereof) to similarly block light reflecting off of horizontal surfaces and light reflecting from vertical surfaces located directly forward. When the short axis is positioned in the vertical direction, the light-blocking region can be made broader for polarized light entering in a horizontal direction. Conversely, when the long axis is positioned in the vertical direction, the light-blocking region can be made broader for polarized light entering from the vertical directions on the left and right sides.

A further desirable embodiment of the polarizing lens of the present invention is a configuration in which the polarizing layer contains a dye (dye layer), and an orientation layer is present between the dye layer and the substrate. Providing such an orientation layer and a dye layer, making the dye layer a polarizing layer, and forming a pattern of peaks and valleys on the surface of the orientation layer can permit ready control of the directions of the polarization axes of the dye layer above it. Thus, it is readily possible to form various curved polarization axes including arc-shaped (portions of circles or ellipses) axes.

A further embodiment of the polarizing lens of the present invention is a polarizing lens containing an additional polarizing layer comprising polarization axes directions of which are different from those of the polarization axes of the above polarizing layer.

Providing the two polarizing layers described above can permit the realization of a gradual or partial change in contrasting density (gradation) within the lens surface.

The polarizing lens of the present invention can achieve a light-blocking effect on reflected light over a greater range of angles of incidence than conventional polarizing lenses.

Other exemplary embodiments and advantages of the present invention may be ascertained by reviewing the present disclosure and the accompanying drawing.

BRIEF DESCRIPTION OF THE DRAWINGS

The present invention will be described in the following text by the exemplary, non-limiting embodiments shown in the figure, wherein:

In FIG. 7A, the direction of polarization of the light is nearly vertical. In FIG. 7B, it is about 30 degrees away from vertical, and in FIG. 7C, about 60 degrees. FIG. 7D shows the case where it is roughly the horizontal direction.

DETAILED DESCRIPTION OF THE EMBODIMENTS

Figure 1:
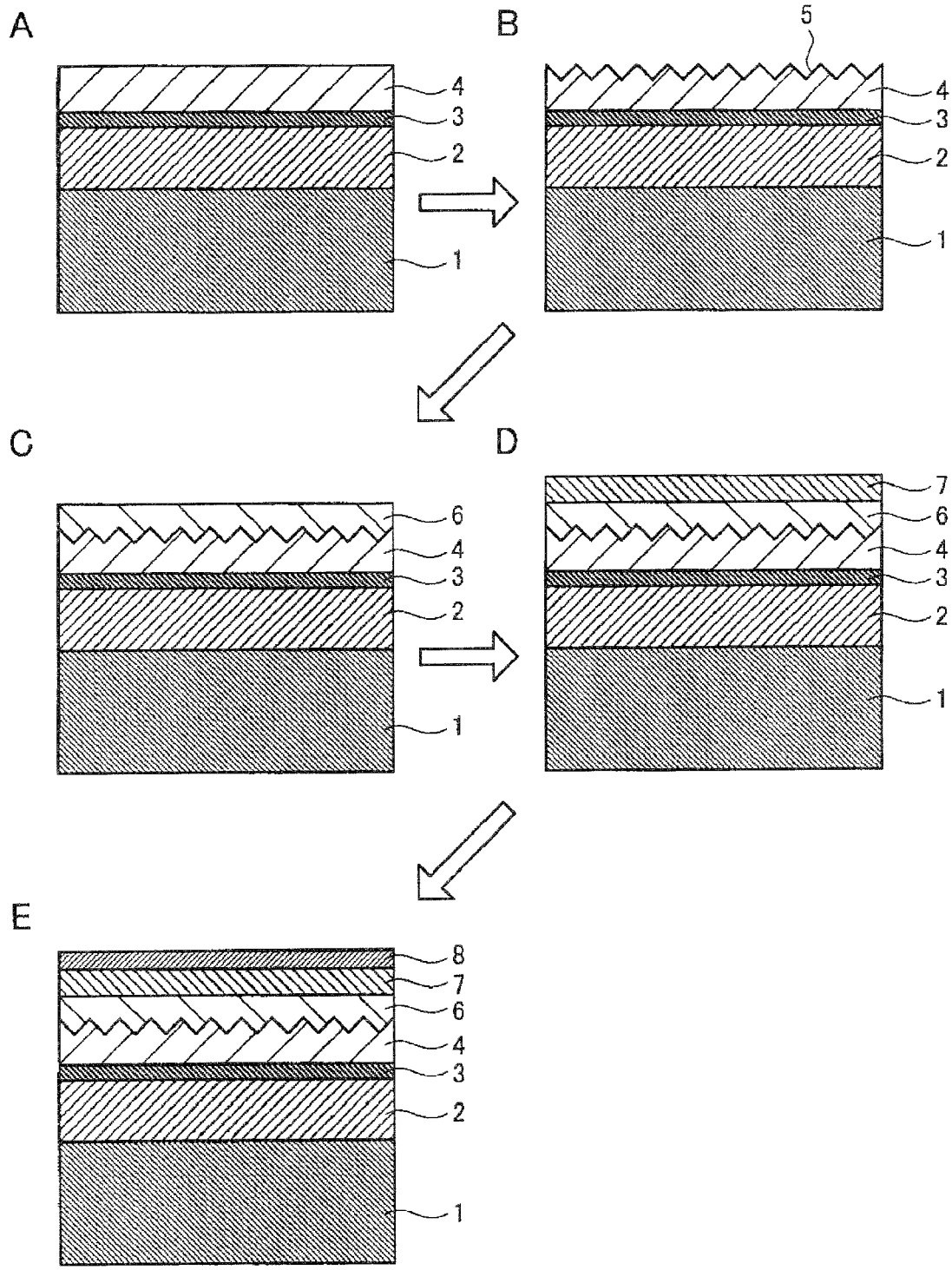
FIGS. 1A to 1E are diagrams of steps in a method of manufacturing a polarizing lens relating to a mode of carrying out the present invention.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

Modes of carrying out the invention will be described in detail below. The description will be given in the following sequence.

1. First implementation mode
   (1) Substrate
   (2) Orientation layer
   (3) Polarizing layer
   (4) Manufacturing method
   (5) Basic structure of polarizing lens
   (6) Distribution of directions of polarization axes
   (7) Changes in the light-blocking region based on differences in directions of polarization
2. Second implementation mode
3. Third implementation mode The polarizing lens of the present invention can be applied to eyeglasses and sunglasses, as well as to any lenses performing the function of allowing a wearer to view the outside world through polarizing lenses. For example, it can be applied to optical applications such as automobile windshields and window glass in buildings. Of these, the polarizing lens of the present invention is preferably employed as a plastic eyeglass lens. The refractive index of the lens is not specifically limited, and is normally about 1.5 to 1.8.

1. First Implementation Mode
   (1) Substrate

The substrate in the polarizing lens of the present invention is not specifically limited; examples are plastic and inorganic glass. Examples of plastics are methyl methacrylate homopolymer, copolymers of methyl methacrylate and one or more other monomers, diethylene glycol bisallyl carbonate homopolymer, copolymers of diethylene glycol bisallyl carbonate and one or more other monomers, iodine-containing copolymers, halogen copolymers, polycarbonates, polystyrenes, polyvinyl chloride, unsaturated polyester, polyethylene terephthalate, polyurethanes, polythiourethanes, polymers made from materials including epithio group-containing compounds, homopolymers of monomers having sulfide bonds, copolymers of a sulfide and one or more other monomers, copolymers of a polysulfide and one or more other monomers, and copolymers of a polysulfide and one or more other monomers.

When the polarizing lens also does double duty as a corrective lens, either the front surface, which is considered to be the object side, or the image side, which is the rear side and considered to be the eyeball side, or both sides, can be molded, surface polished, or the like to form curved surfaces imparting a prescribed number of diopters of correction.

(2) Orientation Layer

An orientation layer can be provided between the substrate and the polarizing layer to specify the directions of the polarization axes. When formed of inorganic materials, examples of the inorganic materials are metal oxides, and complexes thereof, selected from among Si, Al, Zr, Ti, Ge, Sn, In, Zn, Sb, Ta, Nb, V, and Y. Of these, SiO and SiO$_2$ are suitable because they are relatively inexpensive and easy to handle. The thickness of the orientation layer need only fall within a range permitting the uniform formation of polarization axes in the polarizing layer provided over it, and can be, for example, equal to or higher than about 85 nm and equal to or lower than about 500 nm.

A material containing organic compounds can also be employed as the material used to form the orientation layer so long as it affords a certain degree of adhesion to the substrate and permits the ready specification of the directions of the polarization axes in the upper polarizing layer. Examples of such materials are sol-gel films containing (A) inorganic oxide sols, and (B) at least either the alkoxysilane denoted by general formula (1) below and/or the hexaalkoxydisiloxane denoted by general formula (2) below. As needed, a sol-gel film employing a material containing (C) the functional group-containing alkoxysilane-containing compound denoted by general formula (3) below can be employed as the above material.

$$Si(OR^1)_a(R^2)_{4-a} \quad (1)$$

$$(R^3O)_3Si\text{—}O\text{—}Si(OR^4)_3 \quad (2)$$

$$R^5\text{—}Si(OR^6)_b(R^7)_{3-b} \quad (3)$$

In the above formulas, each of $R^1$ in general formula (1) above and $R^3$ and $R^4$ in general formula (2) above independently denotes a linear, branched, or cyclic alkyl group having 1 to 5 carbon atoms, such as a methyl group, ethyl group, n-propyl group, isopropyl group, n-butyl group, isobutyl group, sec-butyl group, tert-butyl group, pentyl group, or cyclopentyl group. Of these, a methyl group or ethyl group is desirable.

In general formula (1), $R^2$ denotes an alkyl group with 1 to 10 carbon atoms. Examples are the above alkyl group having 1 to 5 carbon atoms, a hexyl group, a heptyl group, an octyl group, and a 2-ethylhexyl group. Of these, a methyl group, ethyl group, propyl group, or butyl group is desirable. In general formula (1), a denotes 3 or 4.

Examples of tetraalkoxysilanes (where a=4 in the formula) denoted by general formula (1) are: tetraethoxysilane (TEOS), tetramethoxysilane, tetraisopropoxysilane, tetra-n-propoxysilane, tetra-n-butoxysilane, tetra-sec-butoxysilane, and tetra-tert-butoxysilane.

Examples of trialkoxysilanes (where a=3) denoted by general formula (1) are methyltrimethoxysilane, methyltriethoxysilane, methyltriisopropoxysilane, methyltri-n-propoxysilane, methyltri-n-butoxysilane, methyltri-sec-butoxysilane, and methyltri-tert-butoxysilane.

The hexaalkoxydisiloxane denoted by general formula (2) is not specifically limited. Examples are hexamethoxydisiloxane and hexaethoxydisiloxane.

In general formula (3), $R^5$ denotes an organic group having one or more functional groups selected from the group consisting of glycidoxy groups, epoxy group, amino groups, and isocyanate groups; each of $R^6$ and $R^7$ independently denotes an alkyl group having 1 to 5 carbon atoms and b denotes 2 or 3.

Normally, a pattern of peaks and valleys of prescribed shape is formed in the orientation layer. The details thereof will be set forth further below. The orientation layer can be directly laminated onto the substrate, or some other layer may be inserted between the substrate and the orientation layer. Examples of other layers are hard coat layers and primer layers.

The material of a hard coat layer is not specifically limited. Coating compositions comprised of known organic silicon compounds and inorganic oxide colloid particles can be employed. The organic silicon compounds and inorganic oxide colloid particles described in paragraphs [0071] to [0074] of Japanese Unexamined Patent Publication (KOKAI) No. 2007-77327, for example, can be employed. The content of the above publication is expressly incorporated herein by reference in its entirety. The coating composition for hard coat layer can be prepared by a conventionally known method.

As an example of the method of forming the hard coat layer on the substrate, the coating composition is coated on the substrate, and as needed, subjected to a curing process based on the curable component contained in the coating composition. Commonly employed methods such as dipping, spin coating, and spraying can be applied as the coating means. From the perspective of surface precision, dipping and spin coating are preferred.

From the perspective of enhancing adhesion of the primer layer, various known resins such as polyurethanes can be employed. The primer layer can be formed by the method as described above for the hard coat layer.

(3) Polarizing Layer

The polarizing layer of the polarizing lens of the present invention is desirably a dye-containing layer. The dye is suitably a dichroic dye. In the present invention, the term "dichroic" means properties in which the color of transmitted light is different depending on the direction of propagation due to the presence of anisotropy in the medium in the selective absorption of light. Dichroic dyes have the properties of intensified polarized light absorption in a specific direction of dye molecules, and diminished light absorption in a direction perpendicular to the above direction. Among dichroic dyes, when water is employed as solvent, some are known to exhibit liquid crystal states at certain concentration and temperature ranges. Such liquid crystal states are referred to as lyotropic liquid crystals. By utilizing the liquid crystal states of these dichroic dyes to cause the dye molecules to array themselves in a single specified direction, it is possible to achieve more intense dichroism.

Dichroic dyes that are known to be commonly employed, not just in eyeglass lens applications, but also in common polarizing elements can be used in the present invention. Examples are azo, anthraquinone, merocyanine, styryl, azomethine, quinone, quinophthalone, perylene, indigo, tetrazine, stilbene, and benzidine dies. The dyes described in U.S. Pat. No. 2,400,877 and Published Japanese Translation (TOKUHYO) No. 2002-527786 of a PCT International Application, which are expressly incorporated herein by reference in their entirety, are further examples.

(4) Manufacturing Method

An example of the method of manufacturing the polarizing lens of the present invention will be described with reference to the step diagrams of FIGS. 1A to E.

First, as shown in FIG. 1A, on substrate 1, as needed, hard coat layer 2 is formed for increasing resistance to scratching, for example, and primer layer 3 is formed to enhance adhesion and impact-resistance by the methods set forth above (for example, by coating by spin coating or the like and curing). Orientation layer 4 is then formed over primer layer 3.

When orientation layer 4 is being formed of inorganic materials such as SiO and $SiO_2$, it is desirably formed by vapor deposition or the like. When being formed of a material containing an organic compound, as set forth above, for example, an inorganic oxide sol, a compound containing at least one compound denoted by general formula (1) or (2), and, as needed, the material denoted by general formula (3) can be employed to fabricate a sol-gel film by spin coating or the like. In that case, the use of elaborate vacuum deposition equipment is not required, so the complexity can be eliminated and the manufacturing steps can be simplified. In that case, neither the solvent that is employed to prepare the coating liquid, the catalyst that is employed to promote the hydrolysis reaction of the silane compound, nor the quantities added or the like are specifically limited. It suffices to use a coating method such as spin coating on a material and with composition ratio that permit the formation of a film of uniform thickness and quality. Nor is the method of preparing the coating liquid specifically limited.

When above-described hard coat layer 2 and primer layer 3 are not provided, before applying the coating solution of orientation layer 4, the surface of substrate 1 can be chemically treated with an acid, alkali, or various organic solvents, physically treated by irradiation with plasma, irradiation with UV, or the like, subjected to a washing treatment with various cleaning agents, or subjected to sand blasting to enhance adhesion between the substrate and the orientation layer.

The above coating liquid can be applied by spin coating to substrate 1 and then thermoprocessed to fabricate a sol-gel film. The thickness of the sol-gel film is desirably 0.02 to 5 micrometers, preferably 0.05 to 0.5 micrometer. When the thickness is equal to or higher than 0.02 micrometer, the film does not peel off as a whole during polishing and good functioning can be imparted as orientation film 4. When equal to or less than 5 micrometers in thickness, the generation of cracks can be reduced.

Next, as shown in FIG. 1B, peak and valley pattern 5 of prescribed shape is formed in orientation layer 4. Peak and valley pattern 5 can be readily formed as rubbing traces by rubbing the surface with a material that is of suitable hardness with respect to orientation layer 4 and has a suitably coarse surface. Achieving a certain degree of uniformity in the width and depth of peak and valley pattern 5 can prevent nonuniformity in the polarizing function.

Thus, it is desirable, for example, to prepare a slurry of a polishing material with a particle diameter falling within a prescribed range and use the slurry to form peak and valley pattern 5 by rubbing. In addition to employing a slurry, rubbing with a material comprised of a polishing sheet, on which are secured abrasive grains, that has been adhered to the surface of an elastic member, can also be conducted. When the rubbing material is smaller than the lens, it is possible to form curved rubbing traces such as arc-shaped traces over the entire lens surface by displacing the rubbing material relative to the lens along a straight line passing through the geometric center of the lens, for example, and making multiple rubs.

For most liquid crystals, friction-processing or polishing in one direction on the substrate is known to cause the liquid crystals that are coated on the substrate to align in a certain directional relation relative to the direction of the processing traces. For example, in the manufacturing of liquid-crystal displays (LCDs), to get the liquid crystals to align within the cells, it is well-known that an orientation film (polyimide film or the like) adhered to the substrate surface is rubbed in a single direction by so-called rubbing processing. The technique of coating dichroic dye-containing solution on a substrate that has been polished in one direction and exploiting the dichroism of the dye to cause it to align is disclosed in U.S. Pat. Nos. 2,400,877 and 4,865,668, which are expressly incorporated herein by reference in their entirety.

In the present invention, as in the case of the liquid crystals used to manufacture a liquid-crystal display (LCD), by using an abrasive to rub orientation layer 4 comprised of an $SiO_2$ film or sol-gel film formed on a substrate, the polarization axes can be distributed in desired directions so that the dichroic dye is arrayed in specific directions.

The abrasive that is employed in the rubbing treatment is not specifically limited. For example, a slurry containing abrasive particles that has been immersed in a foam material such as urethane foam can be employed. Examples of abrasive particles are $Al_2O_3$, $ZrO_2$, $TiO_2$, and $CeO_2$. Of these, from the perspectives of hardness relative to the orientation layer formed (ease of polishing and finishing) and chemical stability, $Al_2O_3$ and $ZrO_2$ are desirable. They may be employed singly or in combinations of two or more. The slurry containing abrasive particles may incorporate viscosity-modifying agents, pH-adjusting agents, and the like.

The average particle diameter of the abrasive particles is desirably less than 7 micrometers, preferably 0.05 to 6.7 micrometers, and more preferably, 1.5 to 3.0 micrometers to suppress nonuniformity in the function of blocking incident polarized light.

As set forth above, an orientation layer formed of a material such as a sol-gel film containing an organic substance will be of lower hardness than an orientation layer formed of an inorganic substance such as $SiO_2$. For example, even a rubbing treatment performed with fine abrasive particles with an average particle diameter of less than about 1.5 micrometers can form adequate rubbing traces. Using an abrasive of fine particles of less than about 1 micrometer permits a finer rubbing treatment. Further, the generation of haze due to rubbing traces can be prevented by employing high pressure during rubbing or concentrating the rubbing in a single spot, thereby reducing the generation of defective products, raising the productivity of polarizing lenses, and cutting costs. The conditions of the rubbing treatment are not specifically limited. The speed and pressure during rubbing and the rubbing duration (number of times) when revolving the rubbing material in an arc-shape or the like can be suitably adjusted based on the material of the orientation layer.

Figure 2:
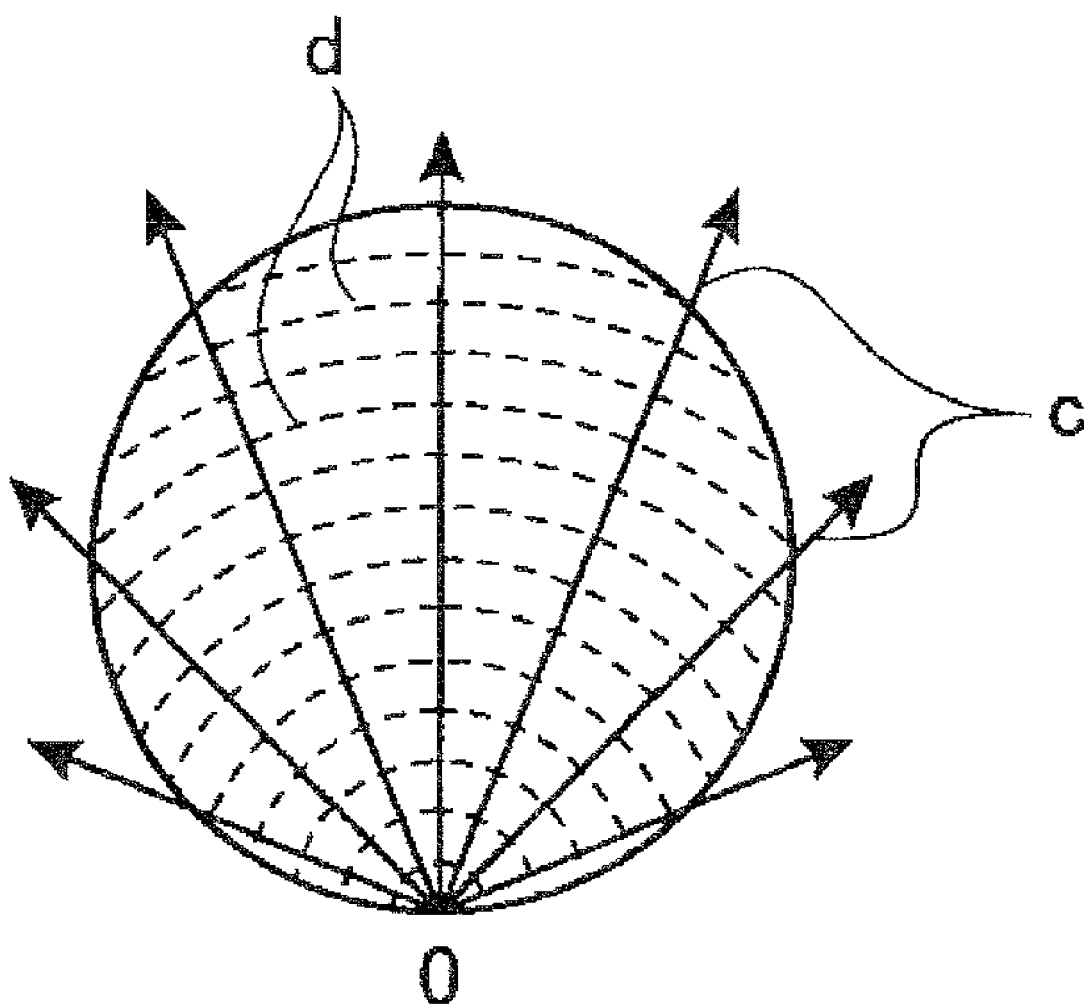
FIG. 2 is a descriptive drawing of an example of a method of forming the pattern of peaks and valleys formed by the step in FIG. 1B.

The rubbing traces that determine the shape of peak and valley pattern 5 will differ depending on whether the material on which the polarization axes of the polarizing layer are formed is lined up with peak and valley pattern 5, or whether they are formed with the material aligned perpendicular to the direction of orientation. In the former case, rubbing is conducted in a manner aligned with the distribution of the targeted direction of the polarization axes to form peak and valley pattern 5. For example, when forming a distribution of arc-shaped polarization axes, rubbing is conducted in an arc shape about a prescribed position. In the latter case, rubbing is conducted in a pattern perpendicular to the distribution of the targeted direction of the polarization axes. For example, when forming a distribution of arc-shaped polarization axes, as shown in the example of the rubbing direction of FIG. 2, it suffices to adopt a position away from the geometric center of substrate 1 as the origin O and conduct rubbing in a radial direction from origin O in the direction of arrows c.

In this case, the distribution of the polarization axes of the polarizing layer formed thereover will be the arc-shaped distribution centered on origin O that is indicated by dotted lines d.

By simply forming orientation layer 4 on substrate 1 and rubbing the surface thereof in this manner, it is possible to form the polarizing layer that is formed thereover, described further below, with a desired distribution of directions of polarization axes. Accordingly, distributions with polarization axes in a variety of directions, such as distributions containing circular or elliptical arcs, or high-order curves, can be achieved based on the objective.

Next, as shown in FIG. 1C, a dichroic dye is deposited in oriented fashion so as to bury peak and valley pattern 5 on the surface of orientation layer 4 and form a polarizing layer 6 on orientation layer 4.

Normally, before forming polarizing layer 6, the surface of orientation layer 4 that has been treated by rubbing is thoroughly cleaned and dried. Next, a solution or suspension (desirably an aqueous solution) containing a dichroic dye is coated on orientation layer 4 that has rubbing traces, and a treatment to render the dichroic dye insoluble in water is conducted to form polarizing layer 6.

To the extent that the effect of the present invention is not lost, dyes other than the above-described dyes can be blended into the aqueous solution or suspension containing the dichroic dye to produce a polarizing lens of desired hue. From the perspective of further enhancing coatability and the like, additives such as rheology modifying agents, adhesion-promoting agents, plasticizers, and leveling agents can be blended in as needed.

The method of coating is not specifically limited. Examples are known methods such as spin coating, dip coating, flow coating, and spray coating.

The method of immersing the dichroic dye that has been coated on orientation layer 4 in a metal salt aqueous solution is desirable as a treatment to render the dye insoluble in water. The metal salt employed is not specifically limited; examples are $AlCl_3$, $BaCl_2$, $CdCl_2$, $ZnCl_2$, $FeCl_2$, and $SnCl_3$. Of these, due to ease of handling, $AlCl_3$ and $ZnCl_2$ are desirable. Following the treatment to render the dye insoluble in water, the dichroic dye-containing layer surface can be dried again.

The thickness of polarizing layer 6 is not specifically limited. To stably utilize the targeted polarizing function, a thickness of equal to or higher than 0.05 micrometer is desirable. Since no additional effect is achieved by an excessive thickness, the thickness desirably falls within a range of equal to or less than 0.5 micrometer.

As shown in FIG. 1D, it is desirable to form protective layer 7 to secure the dye on polarizing layer 6. An organic silicon compound can be employed as the material in protective layer 7. Protective layer 7 can be formed by applying a solution containing an organic silicon compound on polarizing layer 6 by a known means such as dipping, spin coating, or spraying, and then curing it with heat to form a film. In this process, the organic silicon compound may impregnate polarizing layer 6 to form a layer that substantially integrates protective layer 7 and polarizing layer 6 into one. The thickness of the integrated protective and polarized layers is not specifically limited, but desirably falls within a range of 0.05 to 1 micrometer.

Further, as shown in FIG. 1E, functional film 8 such as a scratch resistance-enhancing hard coat film, antireflective film, water repellent film, UV-absorbing film, infrared-absorbing film, photochromic film, or antistatic film can be formed by a known method over protective layer 7.

The above method can permit the fabrication of a high-quality polarizing lens by simple steps.

(5) Basic Structure of the Polarizing Lens

FIG. 3A shows a plan view of the directions of the polarization axes of a polarizing lens relating to a first implementation mode of the invention, and FIG. 3B shows a sectional view of the same along section line I-I.

Figure 3:
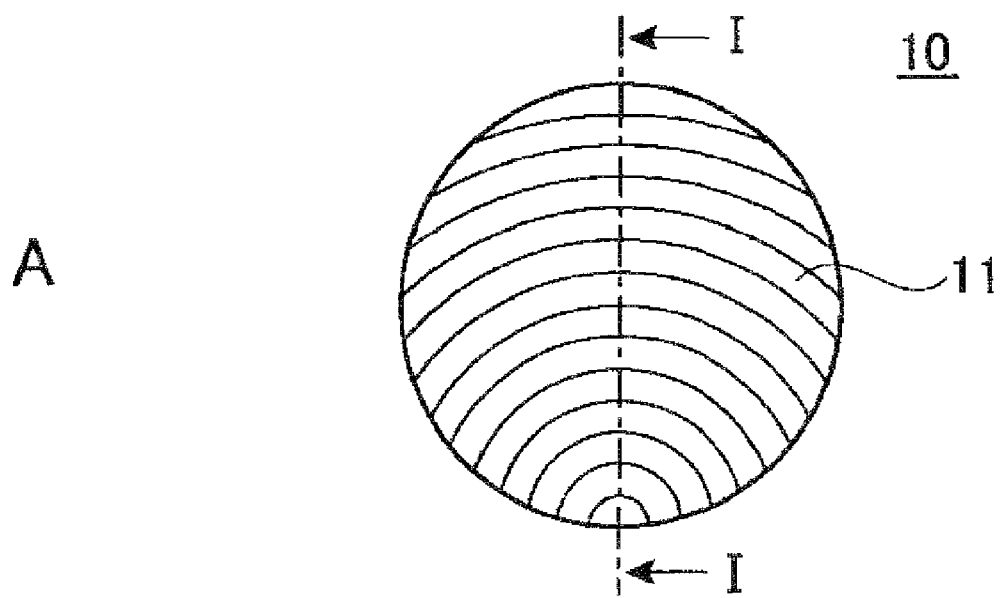
FIG. 3A is a plan view in the directions of the polarization axes of a polarizing lens relating to a first implementation mode of the present invention.
FIG. 3B is a sectional structure view of the same along section line I-I.
Figure 3:
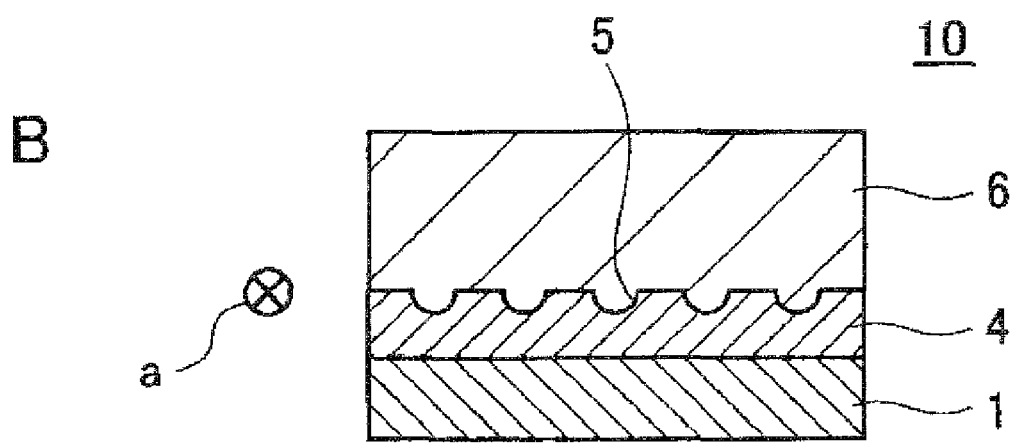

In the polarizing lens 10 of the first implementation mode, as shown in FIG. 3A, the polarization axes 11 are formed as round arcs of concentric circles protruding upward when the lens is worn. In the polarizing lens of FIG. 3, the center of the circles forming the arcs is located at a position removed vertically downward from the geometric center of lens 10 when worn. The radii thereof are about half the radius or less when lens 10 is viewed as being roughly circular, and include regions on the right and left where the tangential direction of the arcs runs diagonally downward. Since polarization axes 11 are absorption axes that absorb light in a specific direction of polarization, polarizing lens 10 functions to block light in polarization directions oriented in the tangential direction of polarization axes 11 that have a protruding arc shape at the top.

As shown in FIG. 3B, polarizing lens 10 is comprised of, for example, orientation layer 4 and polarizing layer 6 containing a material having a polarizing function, such as a dichroic dye, that are sequentially formed on substrate 1 of a light-transmitting material that is molded for use as a lens. As set forth above, a hard coat layer and a primer layer can be provided as needed between orientation layer 4 and substrate 1. Further, as set forth above, a protective layer is desirably provided, and functional films can be further provided as needed, over polarizing layer 6. In this case, as set forth above, by forming peak and valley pattern 5 on the surface of orientation layer 4 and depositing polarizing layer 6 thereover, it is possible to readily form a desired distribution of the directions of the polarization axes in polarizing layer 6. Polarizing layer 6 that is formed on orientation layer 4 has polarization axes (absorption axes) in the direction of extension of peak and valley pattern 5 (the direction vertical to the surface of the paper of FIG. 3, indicated by arrow a in FIG. 3B) or in the direction perpendicular thereto. In the example of FIG. 3B, peak and valley pattern 5 is of a semicircular cross-sectional shape and is arranged in parallel at regular intervals. This is not a limitation. For example, as shown in FIG. 1B, the sectional shape of the peaks and valleys can be saw-toothed or the like, or can be irregular to a certain degree. It suffices to inhibit variation in the width, depth, and density of peak and valley pattern 5 so that a polarizing function free of at least nonuniformity that can be seen by the eye is imparted to polarizing layer 6 formed thereover. The polarizing layer normally contains two or more multiple polarization axes, but the number and spacing thereof is not specifically limited and can be set based on the desired polarization function. The multiple polarization axes within a single surface are normally arranged in parallel, but it suffices to align the directions so that they do not intersect, and they need not be completely parallel.

As set forth above, pattern 5 on orientation layer 4 can be readily formed by rubbing the surface with a material of prescribed elasticity and having an uneven surface, such as a brush or sponge. Accordingly, it is possible to readily manufacture a polarizing layer of desired curved shape without inviting an increase in the number of steps.

(6) Distribution of the Directions of the Polarization Axes

Figure 4:
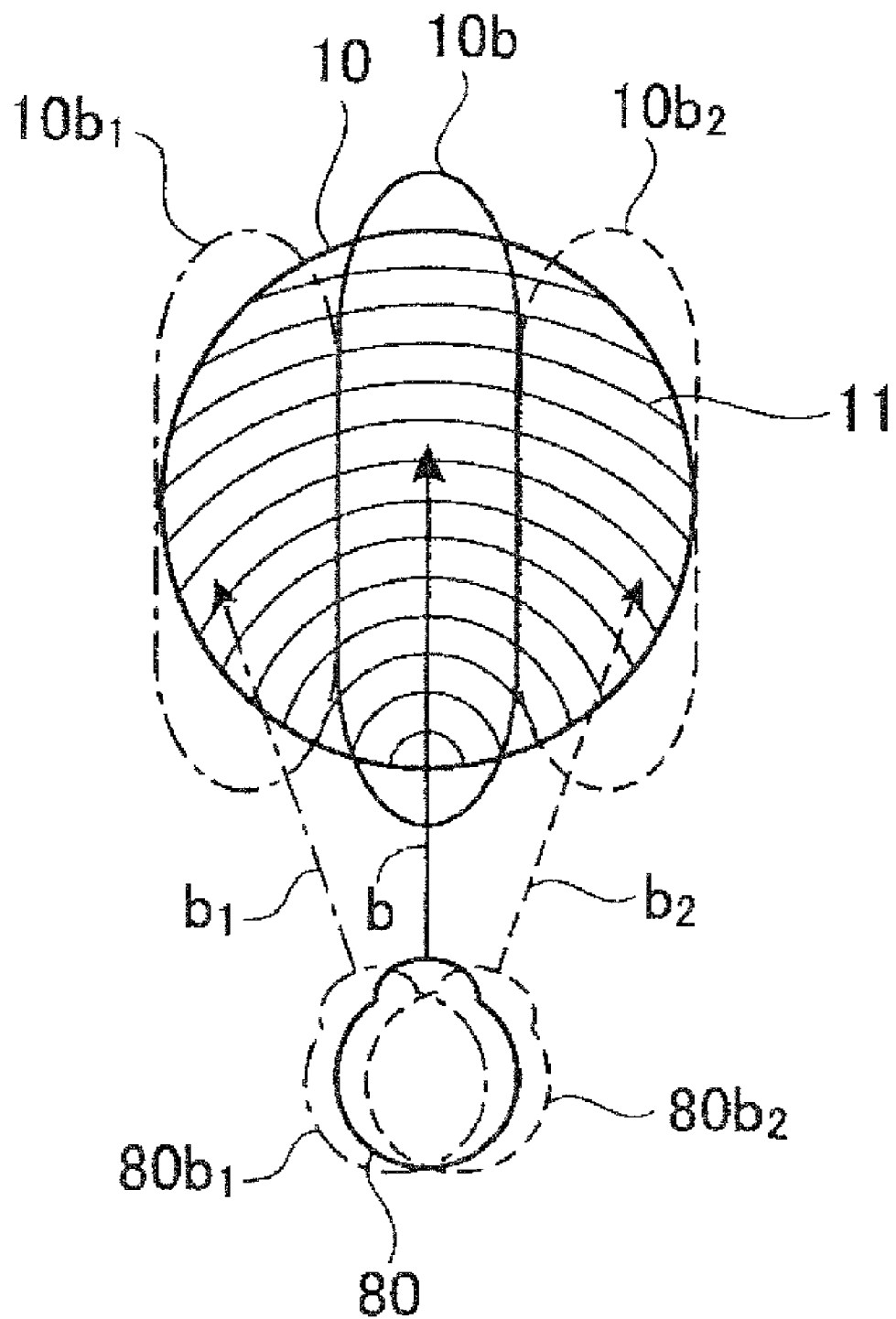
FIG. 4 is a descriptive drawing of the region in the directions of the polarization axes corresponding to revolution movement of the eyeballs in the polarizing lens shown in FIG. 3.

FIG. 4 shows a plan view of the directions of the polarization axes and the directions in which the eyeball revolves in the various regions of polarizing lens 10 of FIG. 3. In FIG. 4, the state where eyeball 80 has turned so that it is inclined to the left is indicated by dot-dash line 80b1, and the state where it is inclined to the right is indicated by dotted line 80b2. The state where the direction of the line of sight corresponding to the direction of revolution of eyeball 80 is the front direction is indicated by solid line b, that where it is left is indicated by dot-dash line b1, and that where it is right by dotted line b2. In front region 10b which includes the region where the direction of revolution of eyeball 80 of the wearer is in the front direction region as well as the upward and downward revolution regions, the polarization axes are nearly horizontal. Thus, as described using FIGS. 11 to 14, light reflecting off of horizontal surfaces such as water and light entering from above that has reflected off of vertical surfaces such as buildings can be efficiently blocked. In contrast, in the left side region 10b1 of lens 10 in the field of view when the direction of the line of sight has become inclined to the left by revolution of eyeball 80, the direction of the polarization axes gradually inclines downward to the left. Similarly, in the right side region 10b2 in the field of view when the direction of the line of sight has become inclined to the right by revolution of eyeball 80, the direction of the polarization axes gradually inclines downward to the right. Since the direction of the polarization axes is arc-shaped, the further the direction of the line of sight moves to the right or left, the greater the angle of incline from the horizontal of polarization axis 11 becomes.

That is, in this case, the distribution is such that the direction of the polarization axes is horizontal in the geometric center of polarizing lens 10 and the direction of the polarization axes gradually inclines diagonally from the horizontal in the right and left peripheral regions with distance from the geometric center. Thus, when the eyeball is revolved from straight forward to the right or left or diagonally upward or downward, a function can be achieved whereby reflected light arriving over diagonal directions is blocked. By continuously changing the direction of the polarization axes in this manner, light with a wide angular range of polarization directions can be blocked.

Figure 5:
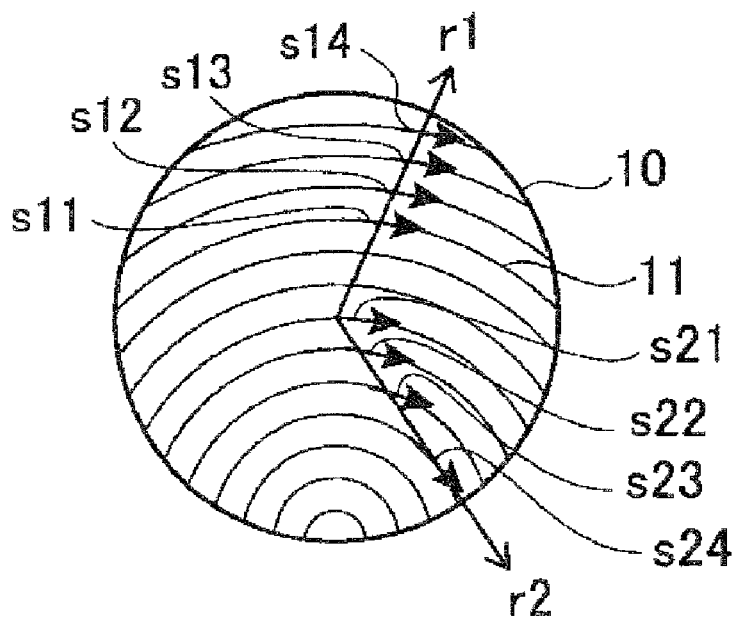
FIG. 5 is a plan view of the distribution of the directions of the polarization axes in the polarizing lens of FIG. 3.

FIG. 5 is a descriptive drawing showing how the directions of the polarization axes change relative to the direction of displacement of the line of sight due to revolution of the eyeball. The direction of the line of sight based on revolution of the eyeball is denoted by arrow r1. As it gradually moves from the front direction to the diagonal upper right direction, that is, as the direction of the line of sight moves away from the geometric center, the angle of incline from the horizontal of the direction of the polarization axes of polarization axes 11, as indicated by arrows s11, s12, s13, s14, and so forth, gradually increases. The amount of change at this time is not exceptionally large. In contrast, as indicated by arrow r2, when the direction of the line of sight moves from the front direction to the diagonal lower right direction due to revolution of the eyeball, the angle of incline of the direction of the polarization axes, as indicated by s21, s22, s23, s24, and so forth, gradually increases and the amount of the change becomes greater than when the revolution angle in the diagonal right upward direction increased.

Figure 6:
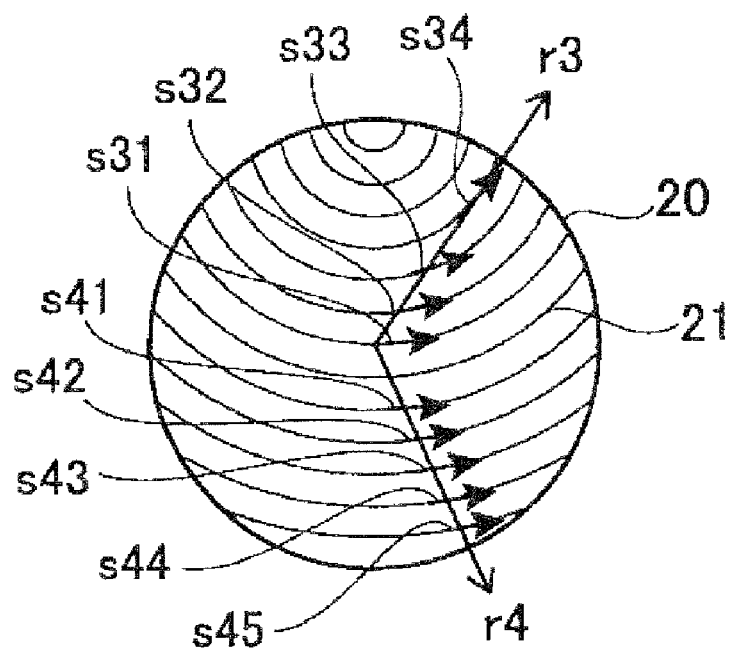
FIG. 6 is a plan view of the distribution of the directions of the polarization axes in another polarizing lens relating to the first implementation mode of the present invention.

Additionally, as shown in FIG. 6, the change in incline of the direction of the polarization axes is reversed in the case of the polarizing lens 20 in which the polarization axes 21 are downwardly protruding arcs. In this example, the radius of the circle forming the arcs is the same as that of the example shown in FIG. 5. The center position is a position that is displaced vertically upward from the geometric center of lens 20. In such a configuration, when the direction of the line of sight is displaced by revolution of the eyeball from the front direction to a direction diagonally upward and to the right as indicated by arrow r3 and the direction of the line of sight moves away from the geometric center, the angle of incline of the direction of polarization axes 21, as indicated by arrows s31, s32, s33, s34, and so forth, gradually increases. At that time, the amount of change is relatively large. Additionally, when the direction of the line of sight is displaced diagonally downward and to the right due to revolution of the eyeball as indicated by arrow r4, the angle of incline from the horizontal of the direction of the polarization axes as indicated by s41, s42, s43, s44, and so forth, gradually increases. However, the amount of the change is less than when diagonally upward and to the right.

That is, when the shapes of the curves of the polarization axes are the arcs of concentric circles, the curvature of the circles near the center of the circles forming the arcs is large and there is a large amount of change. The closer the approach to the position of the center of the circles forming the arcs, the greater the amount of change in the angle of incline from the horizontal of the polarization axes relative to change in the direction of the line of sight due to revolution of the eyeball. Accordingly, it suffices to suitably select the pattern of the polarization axes, that is, the radii and center position of the circles forming the arcs and the like, based on the targeted use environment and use conditions. For example, the pattern shown in FIG. 4 is desirable when attempting to inhibit light reflecting off of horizontal surfaces such as the surfaces of bodies of water even in the diagonally downward region of the lens. When it is desirable to block polarized light arriving in a diagonal direction from vertical surfaces, the pattern shown in FIG. 3 is desirable. From a variety of patterns including these patterns, a pattern obtained for an average polarization state can be selected. Further, the pattern of the distribution in the direction of the polarization axes is desirably selected based on trends in eyeball revolution among standard wearers and actual wearers.

(7) Changes in the Light-Blocking Region Based on Differences in Directions of Polarization In polarizing lens 10 in FIG. 3, changes in the light-blocking region when light actually enters from different directions of polarization will be described next. FIGS. 7A to D are type drawings showing the light-blocking regions appearing in polarizing lens 10 when light (polarized light) passing through polarizing film 70 enters polarizing lens 10. The direction of polarization of the light entering polarizing lens 10 is altered by changing the orientation of polarizing film 70.

FIG. 7A is a plan view of the state when polarizing film 70 is positioned close to polarizing lens 10 having arc-shaped polarization axes 11 that protrude upward. Multiple linear transmission axes are arrayed in parallel in polarizing film 70. Arrow P denotes the direction of the transmission axes of polarizing film 70. In FIG. 7A, since the direction of polarization of polarized light passing through polarizing film 70 is parallel to the transmission axes, it is made the longitudinal direction, that is, the vertical (meridian) direction when wearing lens 10. At that time, since the tangential directions of polarization axes 11 become diagonal in the right and left peripheral region of lens 10, a certain light-blocking effect appears and light-blocking regions 12 are observed in the right and left peripheral regions.

Next, as shown in FIG. 7B, the polarizing film is positioned at an incline of about 30 degrees relative to the vertical direction. The direction of polarization of light passing through film 70 is also about 30 degrees from the vertical direction. In this case, as shown in FIG. 7B, light-blocking region 12 appears in the lower diagonal portion to the right. That is because it becomes a region in which the directions of the polarization axes of lens 10 relative to the direction of the transmission axes of polarizing film 70 denoted by P, that is, the directions of the absorption axes, are nearly parallel.

Similarly, when polarizing film 70 is positioned at an incline of about 60 degrees relative to the vertical direction, the direction of polarization of light passing through film 70 is also rotated by about 60 degrees from the vertical direction. In this case, as shown in FIG. 7C, light-blocking region 12 extending from the center region to the right lateral region appears. In the example shown in FIG. 7C, the incline of polarization axes 11 in the lower right portion becomes nearly vertical with respect to the direction of the transmission axes of polarizing film 70, after which it begins to turn away from light-blocking region 12.

When polarizing film 70 is positioned in an approximately horizontal direction, the direction of the polarized light passing through polarizing film 70 becomes nearly horizontal. At that time, as shown in FIG. 7D, the center portion becomes light-blocking region 12, and light-transmitting regions appear on the left and right edges.

When polarizing film 70 is further rotated, light-blocking regions appear that are left-right inverted versions of the light-blocking regions 12 that appear in FIGS. 7B and 7C.

Figure 7:
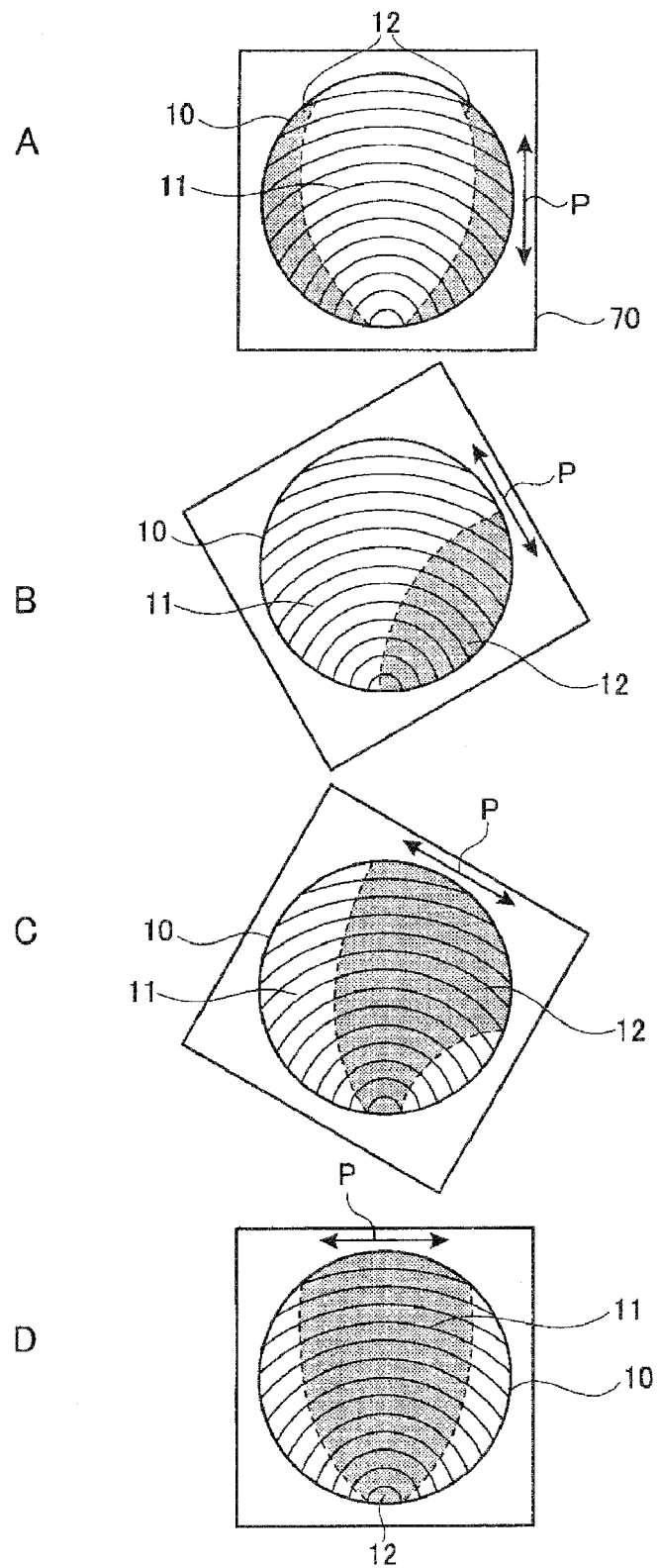
FIGS. 7A to D are plan views of regions blocking light in different directions of the polarization axes in polarizing lenses relating to the first implementation mode of the present invention.

From the examples shown in FIG. 7, it will be understood that the polarizing lenses having the distribution of directions of polarization axes shown in FIG. 7 block both light reflecting off horizontal surfaces and vertical surfaces. They function by primarily blocking reflected light having the direction of polarization in a horizontal direction in a center region, and primarily blocking light reflecting off vertical surfaces in diagonal directions and horizontal directions in a region that is inclined to either the right or the left. Accordingly, the configurations are such that light-blocking region 12 in polarizing lens 10 changes continuously, and not abruptly, for polarized light entering from various angles. In this case, when the wearer senses a glare in a certain direction of line of sight, for example, he can rotate his eyeballs to change the direction of line of sight within the lens, thereby permitting him to attain a certain light-blocking function.

The light-blocking regions described in FIG. 7 are but examples. By changing the distribution of the direction of the polarization axes by changing the radius of curvature and its center position, for example, it is possible to adjust the shape and area of the light-blocking region for polarized light entering from various angles.

2. Second Implementation Mode

Figure 8:
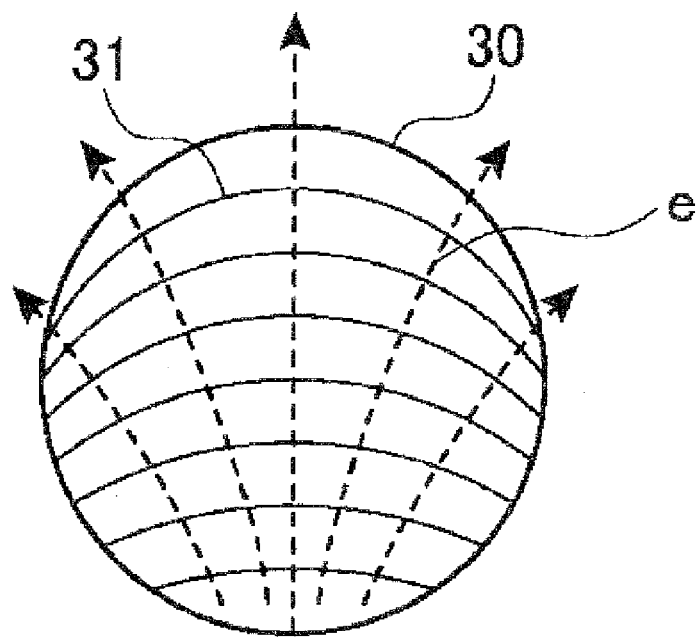
FIG. 8 is a plan view of the directions of the polarization axes of a polarizing lens relating to another mode of carrying out the present invention.

The polarizing lens of a second implementation mode of the present invention will be described next with reference to FIG. 8. In the polarizing lens relating to the present implementation mode, the materials and methods of forming the substrate, orientation layer, polarizing layer, and other layers are identical to those in the examples described in the first implementation mode. As shown in FIG. 8, in the present implementation mode, the shape of polarization axes 31 formed in the polarizing lens 30 is that of arcs but not on concentric circles. Instead, the radius of curvature gradually changes as a center position of the circle forming each arc moves. That is, as shown in FIG. 8, for example, the distribution is such that the center position of the circles forming the various arcs is positioned toward the vertical bottom when polarizing lens 30 is worn, and with movement outward from this center position, that is, with movement upward within the lens, the radius of curvature decreases (the curvature increases). FIG. 8 shows each polarization axis 31 as being part of a circle with a different radius of curvature. However, a distribution is also possible in which the circles forming the arcs have the same radius of curvature within a region of a certain width, and the radii of curvature gradually change in adjacent regions.

The distribution of the directions of the polarization axes can be controlled by means of the distribution of the peak and valley pattern that is formed in the orientation layer. When the material of the polarizing layer has the property of forming polarization axes that run parallel to the above peak and valley pattern, rubbing traces can be formed along the desired distribution of the directions of the polarization axes. When the material of the polarizing layer has the property of forming polarization axes that run perpendicular to the above peak and valley pattern, rubbing can be conducted by tracing a curved path running from bottom to top and widening to the left and right, with the vertical direction in front as the axis of symmetry, as shown by dotted line e in FIG. 8, to obtain the targeted distribution of polarization axes 31.

The present implementation mode differs from the first implementation mode, in which the distribution of the directions of the polarization axes was that of the arcs of concentric circles, in that it is a distribution in which the angle of incline of the polarization axes changes relatively sharply toward the top in the surrounding regions on the left and right, and in which the incline changes more gently toward the bottom.

Accordingly, it differs from the example described in FIG. 7 in terms of the shape and size of the region that blocks polarized light entering diagonally.

That is, the distribution is roughly right-left symmetrical primarily in the horizontal direction due to the shape of the arcs, and the targeted peak and valley pattern can be easily formed by displacing a rubbing material about a center in the form of a prescribed reference position. That is, the rubbing treatment is simple. Furthermore, when a change in area or shape is desired in the direction of polarization of the light-blocking region, it is possible to achieve a desired polarization state through partial changes in the radius of curvature or by providing arc-shaped polarization axes formed by circles of differing center positions.

3. Third Implementation Mode

Figure 9:
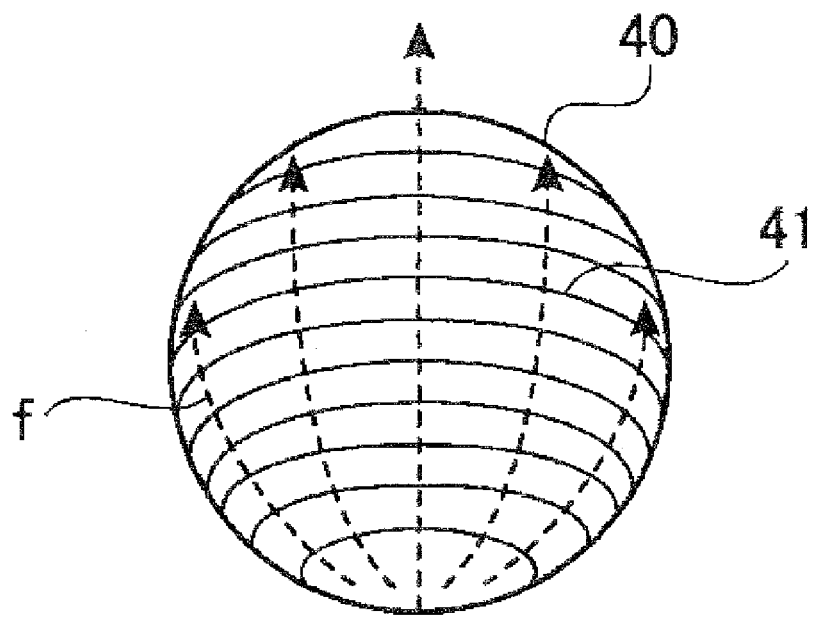
FIG. 9 is a plan view of the directions of the polarization axes of a polarizing lens relating to another mode of carrying out the present invention.
Figure 10:
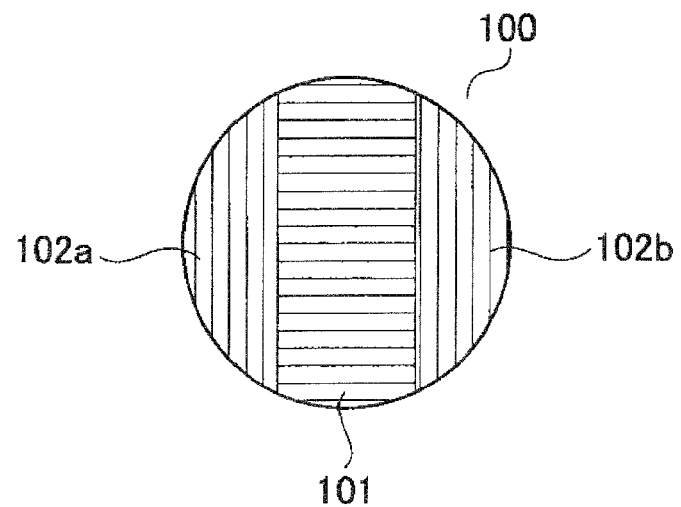
FIG. 10 is a plan view of the directions of the polarization axes of a conventional polarizing lens.
Figure 11:
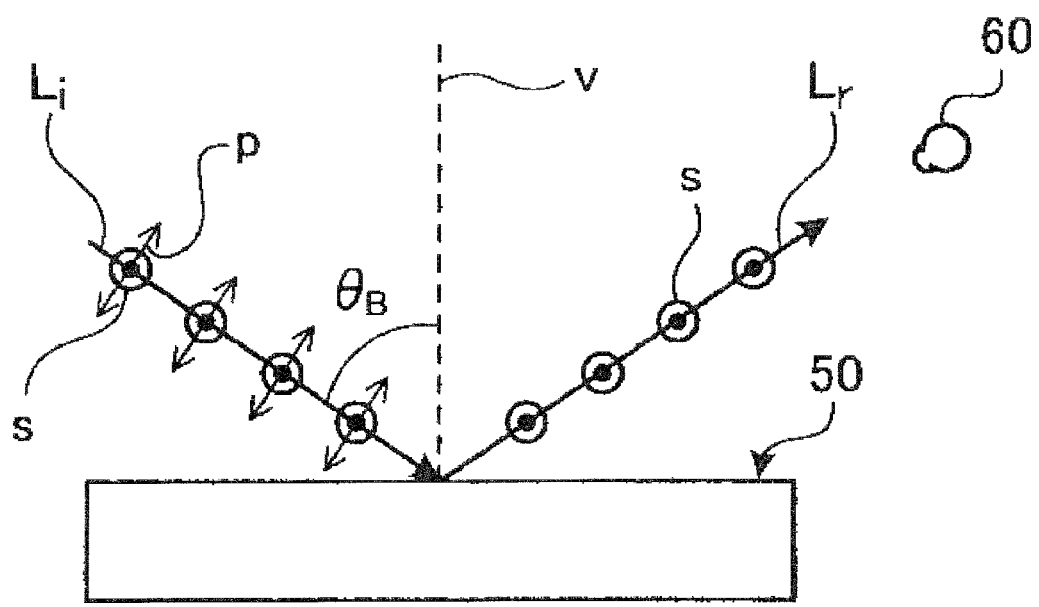
FIG. 11 is a descriptive drawing of the direction of polarization of light reflected off a horizontal surface.
Figure 12:
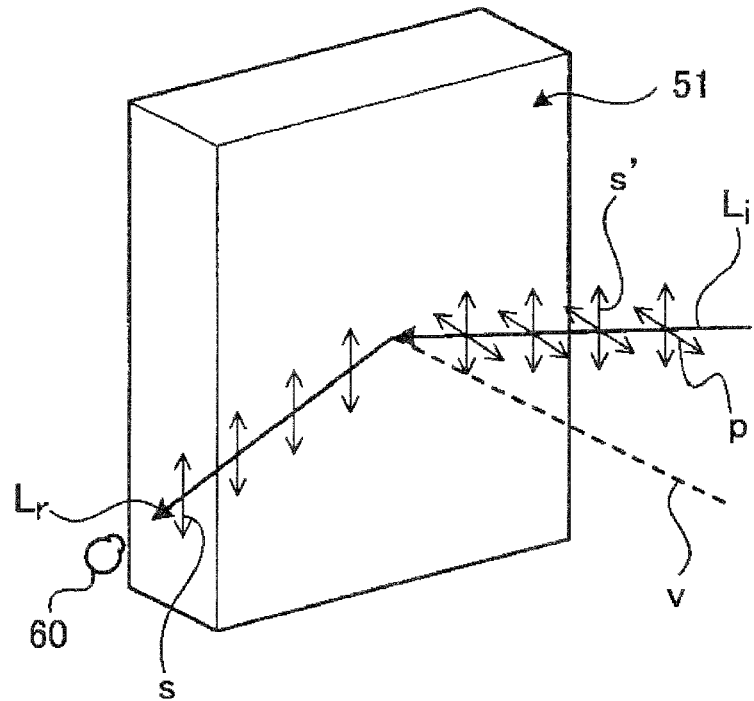
FIG. 12 is a descriptive drawing of the direction of polarization of light reflected in a horizontal direction off a vertical surface.
Figure 13:
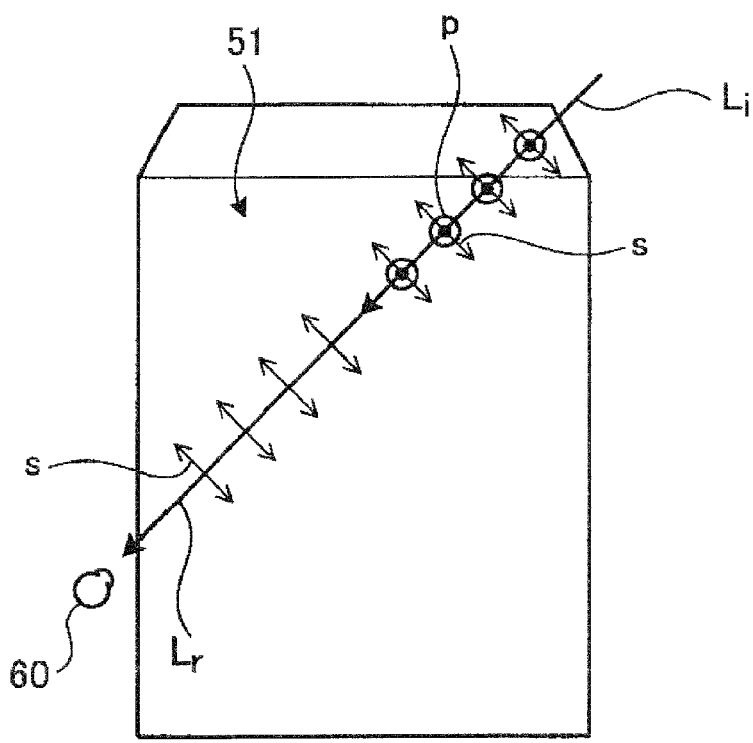
FIG. 13 is a descriptive drawing of the direction of polarization of light reflected off a vertical surface from diagonally above.
Figure 14:
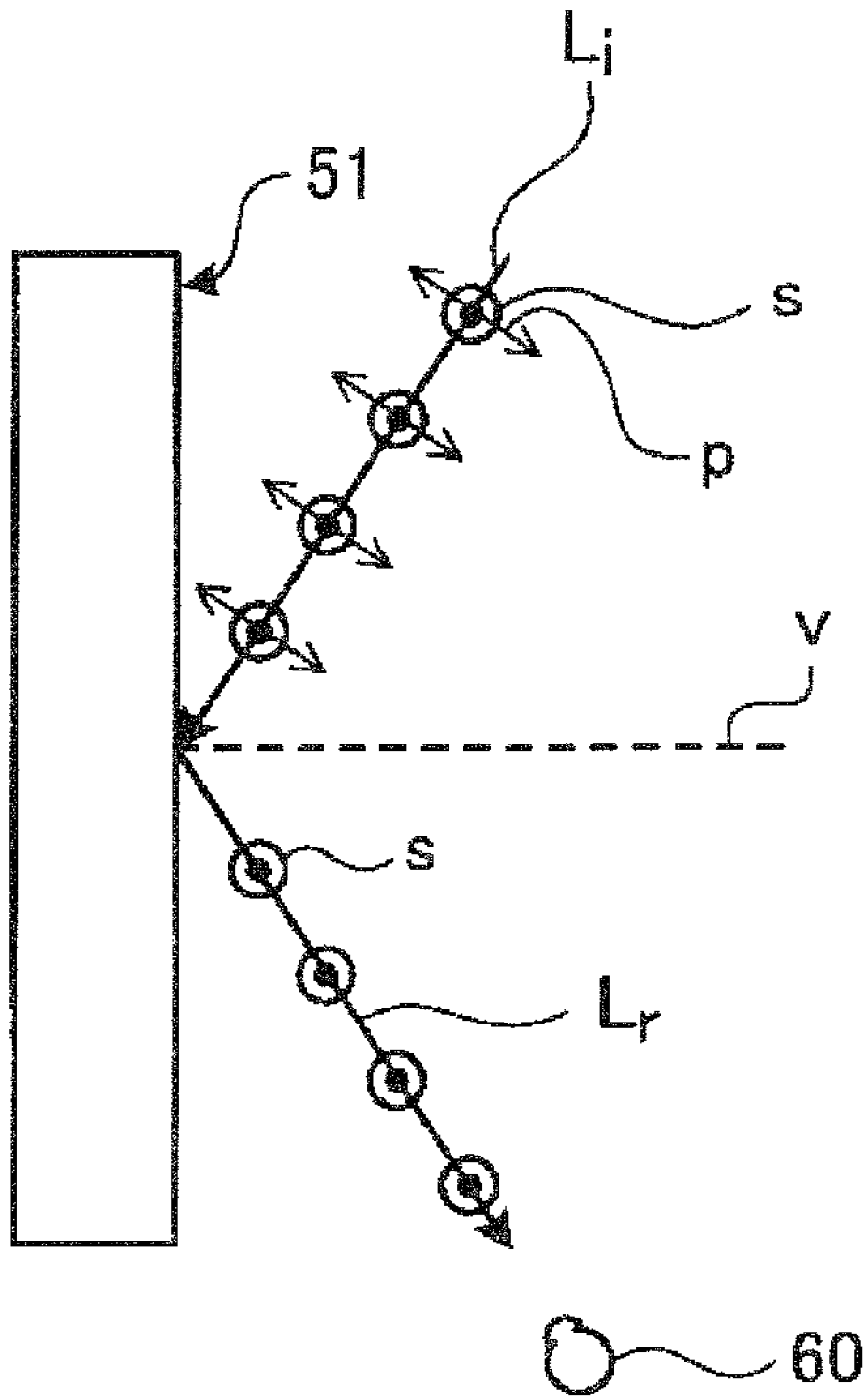
FIG. 14 is a descriptive drawing of the direction of polarization of light reflected off a vertical surface from vertically above.

A polarizing lens relating to a third implementation mode of the present invention will be described next with reference to FIG. 9.

In the polarizing lens relating to the present implementation mode, the materials and methods of forming the substrate, orientation layer, polarizing layer, and other layers are identical to those in the examples described in the first implementation mode. In the present mode of the present invention, as shown in FIG. 9, the distribution of the polarization axes 41 formed in a polarizing lens 40 are made elliptical (that is, arc-shaped polarization axes are formed that are parts of ellipses). The center of the ellipse (the point of intersection of the long axis and the short axis) is positioned so as to be vertically below when lens 40 is worn. In FIG. 9, the long axis of polarization axes 41 lies in the horizontal direction and the ratio of the long axis to the short axis is fixed, with the short axis gradually increasing from bottom to top in a concentric distribution.

In this case, as well, when the material of the polarizing layer has the property of forming polarization axes that run parallel to the peak and valley pattern that is formed in the orientation layer, it suffices to form rubbing traces in the orientation layer along the desired distribution of the directions of the polarization axes. When the material of the polarizing layer has the property of forming polarization axes in the direction perpendicular to the peak and valley pattern, polarization axes 41 of the desired elliptical distribution can be formed by rubbing to leave curved traces that protrude on the right and left with the vertical direction passing through the geometric center as axis of symmetry in a direction perpendicular to the elliptical arcs as indicated by dotted line fin FIG. 9.

In this case, in the same manner as in the first and second implementation modes, the distribution is approximately right-left symmetric primarily in the horizontal direction, and in the same manner as in the first implementation mode, the angle of incline of the polarization axes becomes relatively gentle in the upper portion of the peripheral region on the right and left, and the incline becomes relatively sharp in the lower portion. Accordingly, in this case, the area of the region that blocks polarized light running in the horizontal direction becomes broader in a right and left direction than in the example described for FIG. 7. Further, the configuration is such that a light-blocking function is achieved on light in directions of polarization from diagonal to vertical in the right and left edges.

In all of the examples described in the first through third implementation modes, by distributing the polarization axes right and left symmetrically with the vertical direction (meridian direction) passing through the geometric center as axis of symmetry, it is possible to change the light-blocking region in a manner corresponding to change in the direction of the line of sight through natural movement of the eyeball. In all of the examples, the angle of incline of the polarization axes from top to bottom in the forward region is approximately zero (that is, the directions of the polarization axes are the horizontal direction). Thus, reflected light entering from the front direction is efficiently blocked, as is described in FIGS. 11 and 14 above.

In all of the examples, a continuously curved shape is imparted to the various polarization axes. Thus, no abrupt change in the light-blocking region is encountered during revolution movement of the eyeball, and a polarizing function that corresponds to change in the direction of the line of sight due to rotation of the eyeball can be achieved.

Although no region in which the polarization axes are straight lines over their entire length is provided in any of the examples, a region in which the polarization axes in the front region are horizontal straight lines can be included. In this case, the distribution can be one in which the directions of the polarization axes change continuously with curved portions, it is similarly possible to achieve a polarizing function corresponding to change in the direction of the line of sight based on rotation of the eyeball.

In the polarizing lens of the present invention, in addition to a polarizing layer (also referred to as "the main polarizing layer" hereinafter) having polarization axes at least a portion of which are curved, a polarizing layer (additional polarizing layer) having polarization axes running in different directions from the polarization axes present in the main polarizing layer may also be incorporated. Thus, the color tone of the polarizing lens can be gradually or partly varied over the entire region of the surface or some partial region thereof, and a density distribution identical to that of a tinted lens with a gradient tint can be achieved. This point will be further described. As set forth based on FIG. 7, when a polarizing film is superposed on a polarizing layer having polarization axes that include curved portions, partial light-blocking regions, that is, high-density regions can be formed. These can be utilized to permit a gradual or partial change in the density within the surface by controlling the density and direction of the polarization axes that are formed on the main polarizing layer. By contrast, by superposing polarizing films having linear polarization axes, the color tone exhibited by the polarizing lens changes when the polarization axes of the two films are parallel and when they are perpendicular, but it is impossible to gradually or partly change the density within the surface. That is, the ability to gradually or partly vary the density of the lens within the surface by providing two polarizing layers is an effect that is achieved when curved polarization axes constitute at least a portion of the main polarizing layer.

A curved portion can be incorporated into the polarization axes of the additional polarizing layer in the same manner as in the main polarizing layer. However, in such a case, since the density cannot be gradually or partly varied when the distribution in the directions of the polarization axes is identical to that of the main polarizing layer and the two are superposed, the two layers are desirably disposed in such a manner as to not overlap. From the perspective of facilitating control of color tone, the polarization axes of the additional polarizing layer are desirably linear. When the polarization axes of the additional polarizing layer are linear, the light-blocking region can be varied by changing the direction (axial angle) of the polarization axes as described based on FIG. 7.

The additional polarizing layer can be formed on the opposite side of the substrate from the side on which the main polarizing layer is formed, or on the same side. A specific example of layered configurations comprising a main polarizing layer and an additional polarizing layer, in order from the object side to the eyeball side, are as follows: (1) substrate/main polarizing layer/additional polarizing layer; (2) substrate/additional polarizing layer/main polarizing layer; (3) additional polarizing layer/substrate/main polarizing layer; (4) main polarizing layer/substrate/additional polarizing layer; (5) additional polarizing layer/main polarizing layer/substrate, and (6) main polarizing layer/additional polarizing layer/substrate. In (1) to (6), in addition to the substrate and polarizing layers, although not listed, layers such as the above-described orientation layer, hard coat layer, primer layer, and protective layer can be provided at any position. Further, the method of forming the main polarizing layer is as set forth above. The above-described methods used for the orientation layer are examples of methods of forming the additional polarizing layer. When the additional polarizing layer has linear, polarization axes, a commercial polarizing film or polarizing film prepared by known methods can be adhered using adhesives or the like to laminate the main polarizing layer and the additional polarizing layer. As an example of a method of manufacturing a polarizing film, a polyvinyl alcohol film can be impregnated with a dichroic dye and the film uniaxially extended to orient the dichroic dye along a single axis.

EXAMPLES

The present invention will be described in greater detail below through Examples. However, the present invention is not limited to Examples. The physical properties of the polarizing lenses obtained were evaluated as follows.

1. Evaluation Methods (1) Polarization Efficiency

The polarization efficiency (Peff) was evaluated in accordance with ISO8980-3 by obtaining the parallel transmittance (T//) and vertical transmittance (T⊥) and employing the following equation. The parallel transmittance and vertical transmittance were measured using a visible-light spectrophotometer and a polarizer.

$$Peff(\%) = [(T// - T\perp)/(T// + T\perp)] \times 100$$

(2) Transparency (Haze Value)

A hazemeter HM-150 made by Murakami Color Research Laboratory Co., Ltd. was used to measure the haze value of the polarizing lenses that were produced, and the presence or absence of clouding was determined.

(Evaluation Scale)

○: No clouding (haze value ≦0.4 percent)

×: Clouding present (haze value >0.4 percent)

(3) Adhesion

The adhesive performance of the polarizing lenses that were prepared was evaluated by immersing the polarizing lenses in boiling water for three hours and then subjecting them to a standard adhesive tape test under the measurement conditions given below.

(Measurement Conditions)

Crosscuts were made at intervals of 1.5 mm to form 100 squares in a cured film, adhesive tape was firmly applied to the crosscut area, and the adhesive tape was rapidly peeled off. The number of the 100 squares of the cured film that peeled off was counted. The evaluation scale was as follows.

(Evaluation Scale)

⊚ Number of squares that peeled off: 0/100 (no film peeling)

○ Number of squares that peeled off: 1 to 2/100

△ Number of squares that peeled off: 3 to 5/100

× Number of squares that peeled off: 6 or more/100

2. Example 1

Distribution of Directions of Polarization Axes; Arc Shape Shown in FIG. 3

(1) Preparation of Orientation Layer Coating Liquid

To 4.9 g of silica sol (methanol solvent, solid component 30 weight percent, average primary particle diameter 12 nm) were sequentially added 29.2 g of ethanol, 10.4 g of tetraethoxysilane (TEOS) (molecular weight 208.3), and 2.1 g of γ-glycidoxypropyltrimethoxysilane (γ-GPS) and the mixture was stirred. Next, 2.9 g of 0.01 mol/L of hydrochloric acid (18.4 mol percent of total quantity of coating liquid) was admixed, after which 0.5 g of aluminum catalyst (aluminum acetyl acetate) (0.18 mol percent of total quantity of coating liquid) was added and thoroughly stirred. The mixture obtained was prepared to obtain the final composition. The mixture was passed through a 0.5-micrometer filter to obtain an orientation layer coating liquid.

(2) Formation of Orientation Layer (Production of Sol-Gel Film)

The orientation layer coating liquid that had been prepared was spin-coated (dispensed at 800 rpm, maintained for 60 s) onto the concave surface of a polyurethane urea lens (trade name Phoenix, made by Hoya Corp., refractive index 1.53, hard coated, 70 mm diameter, base curve 4) and then cured by thermoprocessing for 1 hour at 85° C. to prepare an orientation layer (sol-gel film) about 150 nm in thickness.

(3) Rubbing Treatment

The orientation layer obtained was processed by a rubbing treatment using abrasive-containing urethane foam (abrasive: alumina $Al_2O_3$ particles 0.1 to 5 micrometers in average particle diameter; urethane foam: roughly identical in shape to the curvature of the concave surface of the spherical lens) as the rubbing material.

The rubbing treatment was conducted for 30 s at a pressure of 50 g/cm². The rubbing material was swung in an arc shape over the concave surface of the lens, forming the orientation layer with arc-shaped rubbing traces shown in FIG. 3. The lens that was subjected to the rubbing treatment was washed with pure water and dried.

(4) Forming a Polarizing Layer

After drying, 2 to 3 g of a roughly 5 weight percent aqueous solution of dichroic dye was spin coated on the surface that had been subjected to the rubbing treatment to form a polarizing layer. In the spin coating, the aqueous solution of the dye was dispensed at a rotational speed of 300 rpm, which was maintained for 8 s. It was then dispensed at a rotational speed of 400 rpm, which was maintained for 45 s, and then finally dispensed at 1,000 rpm, which was maintained for 12 s. During this stage, the polarizing lens exhibited a polarization efficiency of 99 percent and a transmittance of 30.5 percent. The dichroic dye that was employed had the property of forming polarization axes along the rubbing traces. Thus, the distribution of the directions of the polarization axes in the polarizing layer that was formed was arc shaped, as shown in FIG. 3.

Next, an aqueous solution of an iron chloride concentration of 0.15 M, a calcium hydroxide concentration of 0.2 M, and a pH of 3.5 was prepared. The lens obtained was immersed for about 30 s in this aqueous solution, after which it was removed and thoroughly washed with pure water. This step rendered the water-soluble dye highly insoluble.

(5) Forming a Protective Layer

Subsequently, the lens was immersed for 15 minutes in 10 weight percent aqueous solution of γ-aminopropyltriethoxysilane, washed three times with pure water, and heat cured for 30 minutes at 85° C. After cooling, the lens was immersed for 30 minutes in a 2 weight percent aqueous solution of γ-glycidoxypropyltrimethoxysilane in air, heat cured for 30 minutes in a 100° C. oven, and cooled following curing to form a protective layer.

(6) Forming a Functional Film

The lens on which the protective layer had been formed was polished with an abrasive (particle diameter 0.8 micrometer) and thoroughly washed. A coating of UV-curable resin was then applied by spin coating (dispensed at 500 rpm, maintained for 45 s). Following the coating, curing was conducted at a UV irradiation level of 600 mJ/cm$^2$ with a UV-irradiating apparatus to form a hard coat on the surface on which the protective layer had been formed.

3. Comparative Example

Electron gun vapor deposition under conditions of a lens substrate temperature of about 50° C. and a vacuum of about $10^{-5.5}$ MPa was conducted on a lens substrate of the same material as that employed in Example to prepare a lens substrate on which was vapor deposited an SiO$_2$ film (250 nm in thickness).

Next, the substrate that had been prepared was subjected to a rubbing treatment conducted with an abrasive (Al$_2$O$_3$ particles 0.8 micrometer, 1.3 micrometers, or 3 micrometers in mean particle diameter). The rubbing treatment was conducted for 30 s at a polishing pressure of 50 g/cm$^2$. The rubbing traces were formed in a linear shape in a single axial direction (a constant, fixed direction) by the rubbing.

With the exception of the above steps, a polarizing lens was obtained in the same manner as in Example 1. As set forth above, the dichroic dye employed had the property of forming polarization axes aligned with the rubbing traces. Thus, the polarization axes in the polarizing layer that was formed were linearly aligned in a single axial direction in the same manner as the rubbing traces that had been formed.

The polarization efficiency, adhesion, and transparency of the polarizing lens obtained were evaluated.

|  | Example 1 | Comp. Ex. |
| --- | --- | --- |
| Polarization efficiency at optical center | 98% | 98% |
| 45° direction polarization efficiency in 45° upward direction | 98°% | 49% |
| Transparency | ◯ | ◯ |
| Adhesion | ◎ | ◎ |

As set forth above, the polarizing lens of Example 1 had a polarization efficiency of equal to or greater than 98 percent for horizontal and non-horizontal incident light, which satisfied the general guidelines for polarizing lenses calling for a polarization efficiency of 50 percent. In contrast, the polarizing lens of Comparative Example having linear polarization axes was found to exhibit a 45° direction polarization efficiency of 49 percent in the region of 45° diagonally upward directions, falling short of the guidelines and presenting problems with light arriving in a diagonal direction.

Example 2

Laminated Polarizing Layers

A polarizing film on which multiple linear polarization axes were positioned in parallel was prepared as an additional polarizing layer. The polarizing film that had been prepared was bonded with an adhesive to the hard coat of a polarizing lens prepared by the same method as in Example 1. The photographs shown in FIG. 15 were taken with a digital camera under natural light while varying the polarization axes of the additional polarizing layer clockwise at 60°, 90°, 120°, and 180°, with the vertical being 0°.

Figure 15:
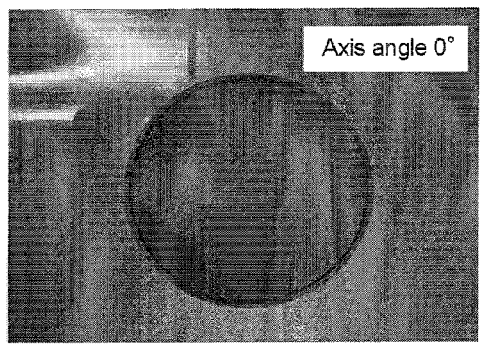
FIG. 15 consists of digital camera photographs, taken under natural light, of polarizing lenses in which a polarizing layer having curved polarization axes and a polarizing layer having linear polarization axes were laminated.
Figure 15:
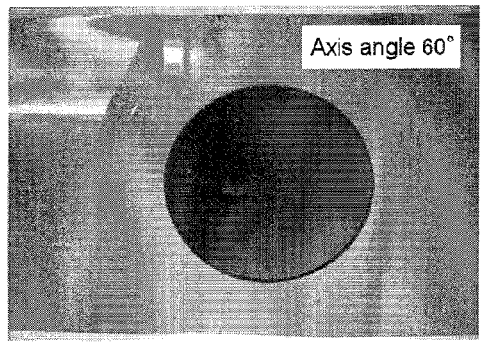
Figure 15:
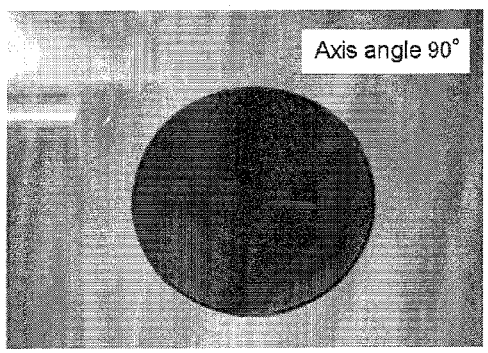
Figure 15:
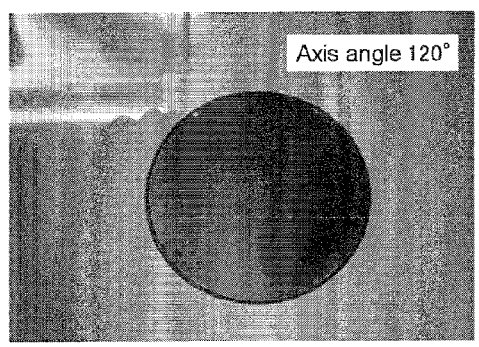
Figure 15:
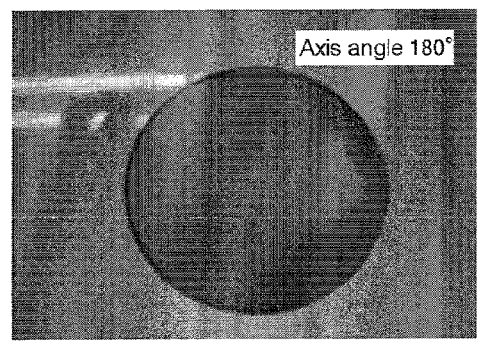

As shown in FIG. 15, at an axial angle of 0°, no density distribution appeared within the surface, in the same manner as the polarizing lens prepared in Example 1. At an axial angle of 60°, the lower right half formed a bright region with no change in the transmittance that could be detected visually, but the upper left half formed a region in which a drop in transmittance could be visually recognized. Additionally, between the regions of high and low transmittance, was formed a region of continuous variation in transmittance, which could be visually confirmed. A density distribution appeared that was identical to that of a lens of constantly varying luminous transmittance (also known as "density" in tinted lenses) called a gradient tinted lens. At an axial angle of 60°, a density gradient formed from the lower right to the upper left. A density distribution was achieved that was equivalent to that of a gradient tinted lens in which the tint density in the upper left direction was high, and the tint density in the lower right direction was low. At an axial angle of 90°, the density distribution was irregular, with a low visible transmittance in the center meridian direction and a high visible transmittance on the left and right sides. At an axial angle of 120°, a density distribution was formed that was identical to the density distribution unique to gradient tinting in the form of the visible transmittance distribution of a 60° axial angle rendered left-right symmetrical in the meridian direction. At an axial angle of 180°, the results were equivalent to those at an axial angle of 0°.

Description of the numbers in the drawings are as follows:

1. Substrate; 2. Hard coat layer; 3. Adhesive layer; 4. Orientation layer; 5. Peak and valley pattern; 6. Polarizing layer; 7. Protective layer; 8. Functional film; 10, 20, 30, 40. Polarizing lenses; 10b. Front region; 10b1. Left side region; 10b2. Right side region; 11, 21, 31, 41: Polarization axes; 12. Light-blocking region; 50. Horizontal surface; 51. Vertical surface; 60, 80, 80b1, 80b2. Eyeballs.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A polarizing lens comprising a polarizing layer on a substrate, wherein the polarizing layer comprises polarization axes that are at least partly curved, and directions of the polarization axes change in arc shapes which are part of an ellipse.

2. The polarizing lens according to claim 1, which comprises polarization axes that are curved and inclined relative to a horizontal direction in a left and right peripheral region away from a geometric center of the lens.

3. The polarizing lens according to claim 1, wherein directions of the polarization axes continuously change.

4. The polarizing lens according to claim 1, which comprises a region in which directions of the polarization axes are horizontal wherein the region is positioned within a region extending from a center region containing a geometric center of the lens to a vertical direction.

5. The polarizing lens according to claim 1, wherein a center of a circle forming the arc is positioned in a region extending from a geometric center of the lens to a vertical direction.

6. The polarizing lens according to claim 1, wherein a short axis or long axis of the ellipse is positioned in a region extending from a geometric center of the lens to a vertical direction.

7. The polarizing lens according to claim 1, wherein polarization axes that are curved are disposed in a region that is made a field of view by changing a direction of a line of sight by rotating an eyeball.

8. The polarizing lens according to claim 1, wherein the polarizing layer is a dye-containing layer and the lens comprises an orientation layer between the substrate and the dye-containing layer.

9. The polarizing lens according to claim 1, which comprises, in addition to the polarizing layer, an additional polarizing layer comprising polarization axes directions of which are different from those of the polarization axes of the polarizing layer.

10. The polarizing lens according to claim 9, wherein the polarization axes of the additional polarizing layer are linear.

* * * * *